(12) United States Patent
Toizumi et al.

(10) Patent No.: US 12,230,005 B2
(45) Date of Patent: Feb. 18, 2025

(54) INFORMATION PROCESSING APPARATUS, INFORMATION PROCESSING METHOD AND RECORDING MEDIUM

(71) Applicant: NEC Corporation, Tokyo (JP)

(72) Inventors: Takahiro Toizumi, Tokyo (JP); Koichi Takahashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/495,352

(22) Filed: Oct. 26, 2023

(65) Prior Publication Data
US 2024/0054753 A1    Feb. 15, 2024

Related U.S. Application Data

(63) Continuation of application No. 17/637,183, filed as application No. PCT/JP2021/010305 on Mar. 15, 2021, now Pat. No. 12,087,029.

(51) Int. Cl.
*G06V 10/46* (2022.01)
*G06T 3/00* (2024.01)
*G06V 40/18* (2022.01)

(52) U.S. Cl.
CPC .............. *G06V 10/462* (2022.01); *G06T 3/00* (2013.01); *G06V 40/193* (2022.01)

(58) Field of Classification Search
None
See application file for complete search history.

(56) References Cited

U.S. PATENT DOCUMENTS

| 11,126,842 | B2 | 9/2021 | Kaehler et al. |
| 2009/0087038 | A1 | 4/2009 | Okada et al. |
| 2010/0110374 | A1* | 5/2010 | Raguin ............... A61B 3/1216 382/117 |
| 2011/0194738 | A1* | 8/2011 | Choi .................... G06V 40/197 382/117 |
| 2014/0355841 | A1* | 12/2014 | Santos-Villalobos ....... G06V 40/193 382/117 |

(Continued)

FOREIGN PATENT DOCUMENTS

| JP | 2008-006149 A | 1/2008 |
| JP | 2009-087209 A | 4/2009 |

(Continued)

OTHER PUBLICATIONS

Sewell et al., "Real-Time Eye Gaze Tracking With an Unmodified Commodity Webcam Employing a Neural Network," CHI 2010: Work-in-Progress (Spotlight on Posters Days 1 & 2) Apr. 12-13, 2010, Atlanta, GA, USA (Year: 2010).*

(Continued)

*Primary Examiner* — Soo Shin

(57) ABSTRACT

An information processing apparatus (2) includes: a reducing unit (211) that generates a second image (IMG2) by reducing a first image (MG1) in which a target object is included; a first extracting unit (212) that extracts, as a first key point, a key point (KP) of the target object from the second image; a setting unit (213) that sets a target area (TA) that designates a part of the first image based on the first key point; and a second extracting unit (214) that extracts, as a second key point, a key point of the target object from a target image (IMG1_TA) of the first image that is included in the target area.

9 Claims, 14 Drawing Sheets

(56) References Cited

U.S. PATENT DOCUMENTS

| | | | | |
|---|---|---|---|---|
| 2016/0063303 | A1* | 3/2016 | Cheung | G06V 40/193 |
| | | | | 382/103 |
| 2017/0119298 | A1* | 5/2017 | Cheung | G06V 40/193 |
| 2018/0239955 | A1 | 8/2018 | Rodriguez et al. | |
| 2018/0276467 | A1 | 9/2018 | Kaehler | |
| 2019/0114480 | A1 | 4/2019 | Kaehler et al. | |
| 2019/0213409 | A1* | 7/2019 | Tsuda | G06T 7/00 |
| 2021/0383098 | A1* | 12/2021 | Takahashi | G06V 40/171 |

FOREIGN PATENT DOCUMENTS

| | | |
|---|---|---|
| JP | 2011-090702 A | 5/2011 |
| JP | 2017-142772 A | 8/2017 |
| JP | 2018-045437 A | 3/2018 |
| WO | 2018/051836 A1 | 3/2018 |
| WO | 2020/095400 A1 | 5/2020 |

OTHER PUBLICATIONS

Boutros et al., "Fusing Iris and Periocular Region for User Verification in Head Mounted Displays," 2020 IEEE 23rd International Conference on Information Fusion (Fusion), Sep. 10, 2020 (Year: 2020).*

US Office Action for U.S. Appl. No. 18/495,279, mailed on Jun. 17, 2024.

US Office Communication for U.S. Appl. No. 17/637,183, mailed on Nov. 21, 2023.

Sewell et al., "Real-Time Eye Gaze Tracking With an Unmodified Commodity Webcam Employing a Neural Network," CHI 2010: Work-in-Progress (Spotlight on Posters Days 1 & 2) Apr. 12-13, 2010, Atlanta, GA, USA (Year: 2010), pp. 3739-3744.

International Search Report for PCT Application No. PCT/JP2021/010305, mailed on Jun. 8, 2021.

* cited by examiner

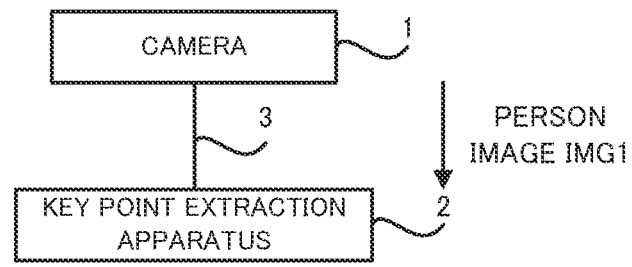
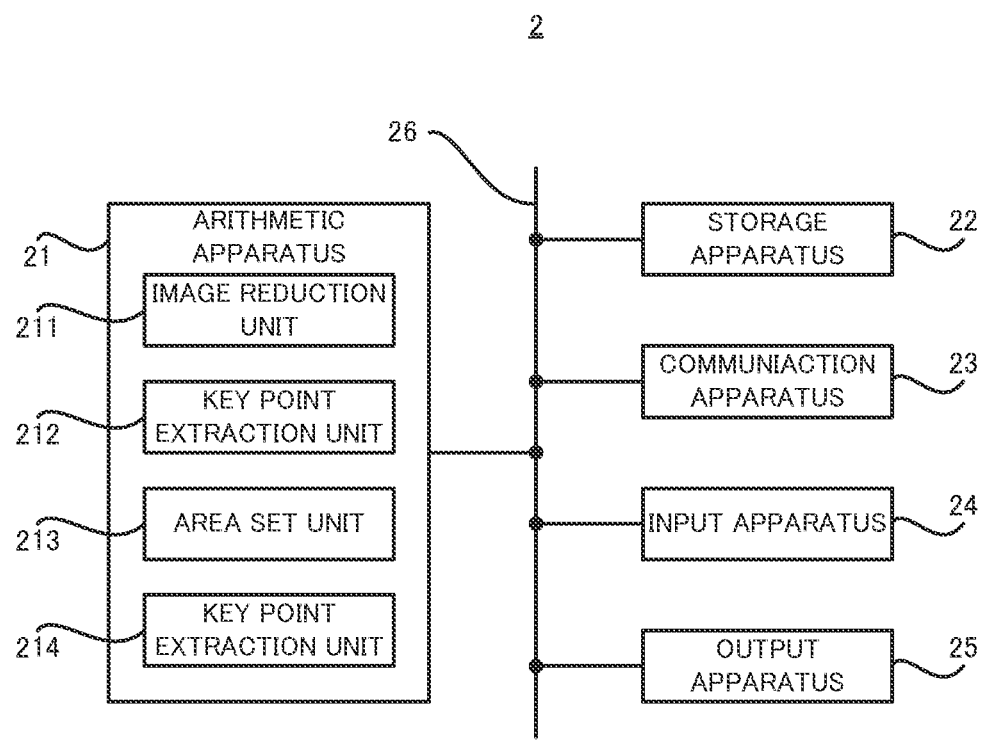
FIG. 1
FIG. 2

INFORMATION PROCESSING APPARATUS, INFORMATION PROCESSING METHOD AND RECORDING MEDIUM

This application is a Continuation of U.S. application Ser. No. 17/637,183 filed on Feb. 22, 2022, which is a National Stage Entry of PCT/JP2021/010305 filed on Mar. 15, 2021, the contents of all of which are incorporated herein by reference, in their entirety.

TECHNICAL FIELD

The present disclosure relates to a technical field of an information processing apparatus, an information processing method and a recording medium that are configured to extract a key point (namely, a feature point) of a target object from an image in which the target object is included, for example.

BACKGROUND ART

A Patent Literature 1 discloses one example of an information processing apparatus that is configured to extract a key point (namely, a feature point) of a target object from an image in which the target object is included. Specifically, the Patent Literature 1 discloses a feature point extraction apparatus that extracts, from an image in which a person is included, a feature point of a face of the person that is used for a face authentication of the person.

Additionally, there are Patent Literatures 2 to 6 as a background art document relating to the present disclosure.

CITATION LIST

Patent Literature

Patent Literature 1: WO2020/095400A1
Patent Literature 2: JP2018-045437A
Patent Literature 3: JP2017-142772A
Patent Literature 4: JP2011-090702A
Patent Literature 5: JP2008-006149A
Patent Literature 6: WO2018/051836A1

SUMMARY

Technical Problem

It is an example object of the present disclosure to provide an information processing system, an information processing method and a recording medium that aims to an improvement of a technique disclosed in the background art document.

Solution to Problem

One example aspect of an information processing apparatus includes: a reducing unit that generates a second image by reducing a first image in which a target object is included; a first extracting unit that extracts, as a first key point, a key point of the target object from the second image; a setting unit that sets a target area that designates a part of the first image based on the first key point; and a second extracting unit that extracts, as a second key point, a key point of the target object from a target image of the first image that is included in the target area.

One example aspect of an information processing method includes: generating a second image by reducing a first image in which a target object is included; extracting, as a first key point, a key point of the target object from the second image; setting a target area that designates a part of the first image based on the first key point; and extracting, as a second key point, a key point of the target object from a target image of the first image that is included in the target area.

One example aspect of a recording medium is a recording medium on which a computer program that allows a computer to execute an information processing method is recorded, the information processing method includes: generating a second image by reducing a first image in which a target object is included; extracting, as a first key point, a key point of the target object from the second image; setting a target area that designates a part of the first image based on the first key point; and extracting, as a second key point, a key point of the target object from a target image of the first image that is included in the target area.

BRIEF DESCRIPTION OF DRAWINGS

FIG. 1 is a block diagram that illustrates an entire configuration of a key point extraction system in a first example embodiment.

FIG. 2 is a block diagram that illustrates a configuration of a key point extraction apparatus in the first example embodiment.

DESCRIPTION OF EXAMPLE EMBODIMENTS

Figure 3:
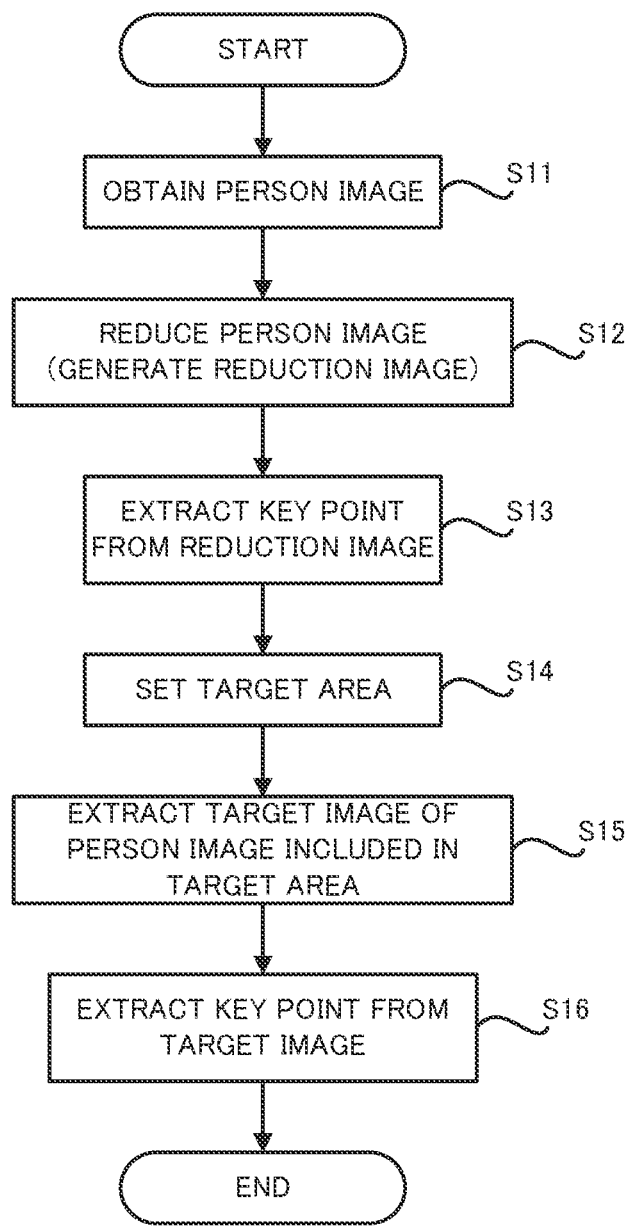
FIG. 3 is a flow chart that illustrates a flow of a key point extraction operation that is performed by the key point extraction apparatus in the first example embodiment.

Next, an example embodiment of an information processing apparatus, an information processing method and a recording medium will be described with reference to the drawings. In the below described description, the example embodiment of the information processing apparatus, the information processing method and the recording medium will be described by using a key point extraction system SYS.

The key point extraction system SYS is configured to extract a key point KP of a target object from an image in which the target object is included. The below described description explains an example in which the key point extraction system SYS is configured to extract the key point KP of a person that is included in a person image IMG1 from the person image IMG1 in which the person (namely, a living body) that is one example of the target object is included. However, the key point extraction system SYS may be configured to extract the key point KP of any target object that is included in an image from the image in which any target object that is different from the person is included. A living body other than a human (for example, at least one of a mammal such as a dog, a cat and so on, a bird such as a sparrow and so on, a reptile such as a snake and so on, an *Amphibia* such as a frog and so on and a fish such as a goldfish and so on) is one example of the target object. An object that is not the living body is another example of the target object. A robot that imitates the human or an animal is one example of the object that is not the living body.

Moreover, the below described description explains an example in which the key point extraction system SYS is configured to extract the key point KR of an iris of the person that is included in the person image IMG1 from the person image IMG1. This key point extraction system SYS may be used as an iris authentication system described in detail later. The iris authentication system is a system that is configured to authenticate the person by using the iris. However, the key point extraction system SYS may be configured to extract the key point KR of any part of the person that is included in the person image IMG1 from the person image IMG1. A part that is usable for authenticating the person is one example of any part of the person. A face that is usable for a face authentication is another one example of the part that is usable for authenticating the person. A finger on which a fingerprint is formed that is usable for a fingerprint authentication is another one example of the part that is usable for authenticating the person. A hand on which a palm print is formed that is usable for a palm print authentication is another one example of the part that is usable for authenticating the person. A finger in which a pattern of a vein is formed that is usable for a vein authentication is another one example of the part that is usable for authenticating the person.

Next, the key point extraction system SYS will be described in more detail with reference to the drawings.

(1) Key Point Extraction System SYS in First Example Embodiment

Firstly, the key point extraction system SYS in a first example embodiment will be described. Note that the key point extraction system SYS in the first example embodiment is referred to as a "key point extraction system SYSa" in the below described description.

(1-1) Entire Configuration of Key Point Extraction System SYSa

Firstly, with reference to FIG. 1, an entire configuration of the key point extraction system SYSa in the first example embodiment will be described. FIG. 1 is a block diagram that illustrates the entire configuration of the key point extraction system SYSa in the first example embodiment.

As illustrated in FIG. 1, the key point extraction system SYSa includes a camera 1 and a key point extraction apparatus 2 that is one specific example of an "information processing apparatus". The key point extraction system SYSa may include a single camera 1 or may include a plurality of cameras 2. The camera 1 and the key point extraction apparatus 2 are configured to communicate with each other through a communication network 3. The communication network 3 may include a wired communication network. The communication network 3 may include a wireless communication network.

The camera 1 is an imaging apparatus that is configured to capture an image of an imaging target range. The camera 1 includes a processing for generating an image in which the imaging target range is included by capturing the imaging target range. Since the key point extraction system SYSa extracts the key point KP of the iris of the person as described above, the person usually exists in the imaging target range. In this case, the camera 1 generates the person image IMG1 in which the person is included by capturing the image of the person. Especially, the camera 1 generates the person image IMG1 in which a face (especially, at least a part of the face including the iris and a part around the iris) of the person is included by capturing the image of the face (especially, at least a part of the face including the iris and a part around the iris) of the person. The camera 1 outputs the generated person image IMG1 to the key point extraction apparatus 2. Specifically, the camera 1 transmits the generated person image IMG1 to the key point extraction apparatus 2 through the communication network 3.

The key point extraction apparatus 2 receives the person image IMG1 transmitted from the camera 1 through the communication network 3. The key point extraction apparatus 2 performs a key point extraction operation for extracting the key point KP of the iris of the person that is included in the person image IMG1 from the received person image IMG1.

(1-2) Configuration of Key Point Extraction Apparatus 2

Next, with reference to FIG. 2, a configuration of the key point extraction apparatus 2 in the first example embodiment will be described. FIG. 2 is a block diagram that illustrates the configuration of the key point extraction apparatus 2 in the first example embodiment.

As illustrated in FIG. 2, the key point extraction apparatus 2 includes an arithmetic apparatus 21, a storage apparatus 22 and a communication apparatus 23. Furthermore, the key point extraction apparatus 2 may include an input apparatus 24 and an output apparatus 25. However, the key point extraction apparatus 2 may not include at least one of the input apparatus 24 and the output apparatus 25. The arithmetic apparatus 21, the storage apparatus 22, the communication apparatus 23, the input apparatus 24 and the output apparatus 25 may be interconnected through a data bus 26.

The arithmetic apparatus 21 includes at least one of a CPU (Central Processing Unit), a GPU (Graphic Processing Unit) and a FPGA (Field Programmable Gate Array), for example.

The arithmetic apparatus 21 reads a computer program. For example, the arithmetic apparatus 21 may read a computer program that is stored in the storage apparatus 22. For example, the arithmetic apparatus 21 may read a computer program that is stored in a non-transitory computer-readable recording medium by using a non-illustrated recording medium reading apparatus of the key point extraction apparatus 2. The arithmetic apparatus 21 may obtain (namely, download or read) a computer program from a non-illustrated apparatus that is placed outside the key point extraction apparatus 2 through the communication apparatus 23 (alternatively, other communication apparatus) The arithmetic apparatus 21 executes the read computer program. As a result, a logical functional block for performing an operation (for example, the above described key point extraction operation) that should be performed by the key point extraction apparatus 2 is implemented in the arithmetic apparatus 21. Namely, the arithmetic apparatus 21 is configured to serve as a controller for implementing the logical functional block for performing the operation (in other words, a processing) that should be performed by the key point extraction apparatus 2.

FIG. 2 illustrates one example of the logical functional block that is implemented in the arithmetic apparatus 21 for performing the key point extraction operation. As illustrated in FIG. 2, in the arithmetic apparatus 21, an image reduction unit 211 that is one specific example of "a reducing unit", a key point extraction unit 212 that is one specific example of "a first extracting unit", a target area set unit 213 that is one specific example of "a setting unit" and a key point extraction unit 214 that is one specific example of "a second extracting unit" are implemented. Note that a detail of an operation of each of the image reduction unit 211, the key point extraction unit 212, the target area set unit 213 and the key point extraction unit 214 will be described later in detail, however, a summary thereof will be described briefly here. The image reduction unit 211 is configured to generate a reduction image IMG2 by reducing the person image IMG1. The key point extracting unit 212 is configured to extract the key point KP of the target object (the iris in the first example embodiment) that is included in the reduction image IMG2 from the reduction image IMG2. The target area set unit 213 is configured to set a target area TA that designates a part of the person image IMG1 based on the key point extracted by the key point extraction unit 212. The key point extracting unit 214 is configured to extract the key point KP of the target object (the iris in the first example embodiment) that is included in a target image IMG1_TA from the target image IMG1_TA of the person image IMG1 that is included in the target area TA set by the target area set unit 213.

The storage apparatus 22 is configured to store a desired data. For example, the storage apparatus 22 may temporarily store the computer program that is executed by the arithmetic apparatus 21. The storage apparatus 22 may temporarily store a data that is temporarily used by the arithmetic apparatus 21 when the arithmetic apparatus 21 executes the computer program. The storage apparatus 22 may store a data that is stored for a long term by the key point extraction apparatus 2. Note that the storage apparatus 22 may include at least one of a RAM (Random Access Memory), a ROM (Read Only Memory), a hard disk apparatus, a magneto-optical disc, a SSD (Solid State Drive) and a disk array apparatus. Namely, the storage apparatus 22 may include a non-transitory recording medium.

The communication apparatus 23 is configured to communicate with the camera 1 through the communication network 3. In the first example embodiment, the communication apparatus 23 receives the person image IMG1 from the camera 1 through the communication network 3.

The input apparatus 24 is an apparatus that receives an input of an information from an outside of the key point extraction apparatus 2 to the key point extraction apparatus 2. For example, the input apparatus 24 may include an operational apparatus (for example, at least one of a keyboard, a mouse and a touch panel) that is operable by an operator of the key point extraction apparatus 2. For example, the input apparatus 24 may include a reading apparatus that is configured to read an information recorded as a data in a recording medium that is attachable to the key point extraction apparatus 2.

The output apparatus 25 is an apparatus that outputs an information to an outside of the key point extraction apparatus 2. For example, the output apparatus 25 may output the information as an image. Namely, the output apparatus 25 may include a display apparatus (what we call a display) that is configured to display the image representing the information to be outputted. For example, the output apparatus 25 may output the information as a sound. Namely, the output apparatus 25 may include an audio apparatus (what we call a speaker) that is configured to output the sound. For example, the output apparatus 25 may output the information on a paper. Namely, the output apparatus 25 may include a print apparatus (what we call a printer) that is configured to print a desired information on the paper.

(1-3) Flow of Key Point Extraction Operation Performed by Key Point Extraction Apparatus 2

Next, with reference to FIG. 3, a flow of the key point extraction operation that is performed by the key point extraction apparatus 2 in the first example embodiment will be described. FIG. 3 is a flowchart that illustrates the flow of the key point extraction operation that is performed by the key point extraction apparatus 2 in the first example embodiment.

As illustrated in FIG. 3, the key point extraction apparatus 2 obtains the person image IMG1 from the camera 1 (a step S11). Specifically, the key point extraction apparatus 2 receives the person image IMG1, which is transmitted to the key point extraction apparatus 2 by the camera 1, by using the communication apparatus 23 through the communication network 3.

Then, the image reduction unit 211 reduces the person image IMG1 obtained at the step S11 (a step S12). As a result, the image reduction unit 211 generates the reduction image IMG2 that is the reduced person image IMG1 (the step S12).

An operation for reducing the person image IMG1 may mean an operation for compressing the person image IMG1. The operation for reducing the person image IMG1 may mean an operation for reducing a data size of the person image IMG1. The operation for reducing a data size of the person image IMG1 may mean an operation fir reducing the number of pixels of the person image IMG1. For example, the operation for reducing the data size of the person image IMG1 to be ⅕ times may mean the operation fir reducing the number of pixels of the person image IMG1 to be ⅕ times.

The image reduction unit 211 may reduce the person image IMG1 at a desired reduction rate. The desired reduction rate may be a fixed value that is determined in advance. The desired reduction rate may be variable. For example, the key point extraction apparatus 2 may change the reduction rate. For example, the operator of the key point extraction apparatus 2 may change the reduction rate.

The image reduction unit 211 may reduce the person image IMG1 by using any image reduction method for reducing the image. For example, the mage reduction unit 211 may reduce the person image IMG1 by using a bicubic method. For example, the image reduction unit 211 may reduce the person image IMG1 by using a bilinear method. For example, the mage reduction unit 211 may reduce the person image IMG1 by using a nearest neighbor method.

Then, the key point extraction unit 212 extracts the key point KP of the iris that is included in the reduction image IMG2 from the reduction image IMG2 generated at the step S12 (a step S13).

Figure 4:
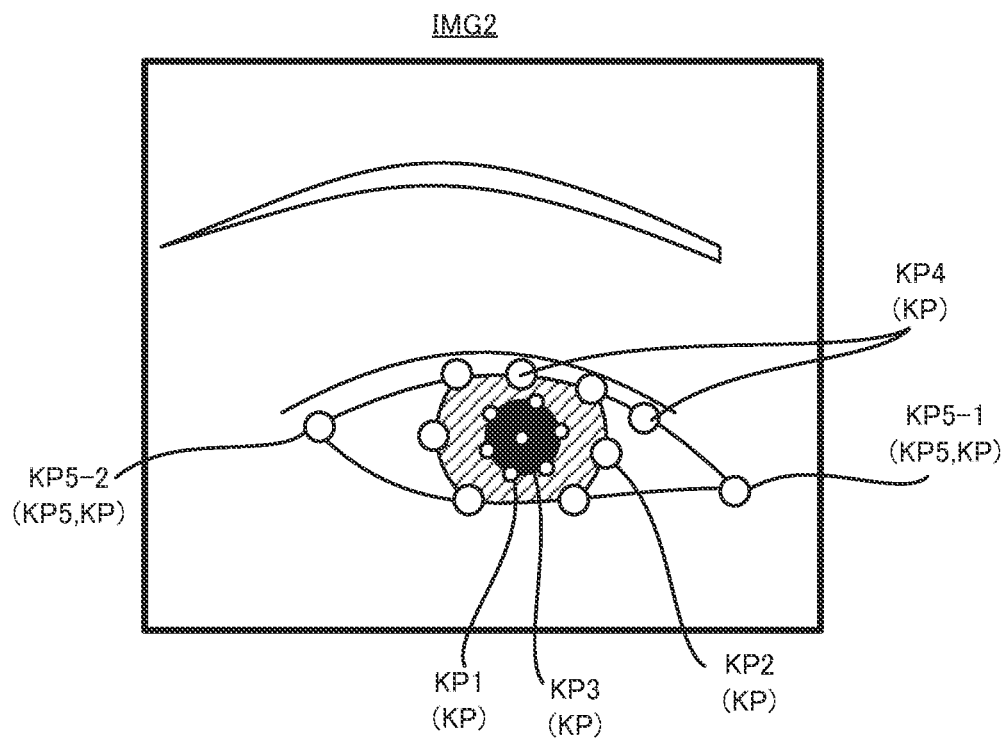
FIG. 4 is a planar view that illustrates one example of a key point of an iris that is extracted from a reduced image.

The key point KP may include a key point KP that corresponds to a point from which a characteristic part of the target object is determinable. Thus, the key point extraction unit 212 may extract, as the key point KP of the iris, a key point KP that corresponds to a point from which a characteristic part of the iris is determinable. For example, as illustrated in FIG. 4 that illustrates one example of the key point KP of the iris extracted from the reduction image IMG2, the key point extraction unit 212 may extract, as the key point KP of the iris, a key point KP1 that corresponds to a point from which an inner outline of the iris (namely, substantially, an outline of a pupil) is determinable. The key point KP1 may be a point that is located on the inner outline of the iris. For example, as illustrated in FIG. 4, the key point extraction unit 212 may extract, as the key point KP of the iris, a key point KP2 that corresponds to a point from which an outer outline of the iris is determinable. The key point KP2 may be a point that is located on the outer outline of the iris. For example, as illustrated in FIG. 4, the key point extraction unit 212 may extract, as the key point KP of the iris, a key point KP3 that corresponds to a point from which a center of the iris is determinable. The key point KP3 may be a point that is located on the center of the iris. Note that the key point extraction unit 212 may extract, as the key point KP of the iris, a key point KP that corresponds to a point from which a center of the pupil, which is located on the center of the iris, is determinable, in addition to or instead of the key point KP3 that corresponds to the point from which the center of the iris is determinable. For example, as illustrated in FIG. 4, the key point extraction unit 212 may extract, as the key point KP of the iris, a key point KP4 that corresponds to a point from which an edge of an eyelid that is likely to hide the iris partially is determinable. The key point KP4 may be a point that is located on the edge of the eyelid. For example, as illustrated in FIG. 4, the key point extraction unit 212 may extract, as the key point KP of the iris, a key point KP5 that corresponds to a point from which an eye including the iris is determinable. As one example, the key point extraction unit 212 may extract, as the key point KP5, at least one of a key point KP5-1 that corresponds to a point from which an inner corner of the eye is determinable and a key point KP5-2 that corresponds to a point from which an outer corner of the eye is determinable.

The key point KP may include a key point KP that corresponds to a line from which the characteristic part of the target object is determinable in addition to or instead of the key point KP that corresponds to the point from which the characteristic part of the target object is determinable. Thus, the key point extraction unit 212 may extract, as the key point KP of the iris, a key point KP that corresponds to a line from which the characteristic part of the iris is determinable. For example, the key point extraction unit 212 may extract, as the key point KP of the iris, a key point KP that corresponds to a line from which the inner outline of the iris is determinable (for example, a line that extends along the inner outline of the iris). For example, the key point extraction unit 212 may extract, as the key point KP of the iris, a key point KP that corresponds to a line from which the outer outline of the iris is determinable (for example, a line that extends along the outer outline of the iris). For example, the key point extraction unit 212 may extract, as the key point KP of the iris, a key point KP that corresponds to a line from which the edge of the eyelid is determinable (for example, a line that extends along the edge of the eyelid). For example, the key point extraction unit 212 may extract, as the key point KP of the iris, a key point KP that corresponds to a line that connects the outer corner of the eye and the inner corner of the eye.

At least one of the point and the line that is extracted as the key point KP may be usable to quantitatively determine the target object. Thus, the key point extraction unit 212 may extract, as the key point KP of the iris, a key point KP that corresponds to at least one of the point and the line that is usable to quantitatively determine the iris. For example, the key point extraction unit 212 may extract, as the key point KP of the iris, a key point KP that corresponds to a line that is usable to determine a size of the iris. As one example, when a shape of the iris is a circular shape, the key point extraction unit 212 may extract, as the key point KP of the iris, a key point KP that corresponds to a line that is usable to determine a radius (for example, a diameter) of the iris that is one example of the size of the iris (for example, a line that passes through the center of the iris and both edges of which exist on the outer outline of the iris). As another example, when the shape of the iris is an oval shape, the key point extraction unit 212 may extract, as the key point KP of the iris, a key point KP that corresponds to a line that is usable to determine at least one of a major diameter and a minor diameter of the iris that are examples of the size of the iris. The line that is usable to determine the major diameter of the iris may include a line that indicates a major axis of the iris, for example. The line that is usable to determine the minor diameter of the iris may include a line that indicates a minor axis of the iris, for example. Incidentally, when at least one of the line that indicates the major axis of the iris and the line that indicates the minor axis of the iris is determined, a rotational angle of the iris (namely, a rotational angle of an ellipse formed by the iris) is also determinable. Thus, when the shape of the iris is the oval shape, the key point extraction unit 212 may extract, as the key point KP of the iris, a key point KP that corresponds a line that is usable to determine the rotational angle of the iris (namely, the rotational angle of the ellipse formed by the iris). For example, the key point extraction unit 212 may extract, as the key point KP of the iris, a key point KP that corresponds to a line that is usable to determine a size (for example, a diameter) of the pupil that is located on the center of the iris.

The key point extraction unit 212 may extract the key point KP by using a neural network. Specifically, the key point extraction unit 212 may extract the key point KP by using a neural network that is configured to output the key point KP of the iris included in the reduction image IMG2 (alternatively, any image including the person image IMG1) when the reduction image IMG2 (alternatively, any image including the person image IMG1) is inputted thereto. It is preferable that a parameter of the neural network be learned by using a learning data that includes a learning image for learning the parameter of the neural network and a ground truth label of the key point KP of the iris included in the learning image (namely, a ground truth key point that is the key point KP that should be extracted from the learning image). Note that the neural network is one example of a learnable learning model. Thus, the key point extraction unit 212 may extract the key point KP by using any learning model that is different from the neural network.

An operation for extracting the key point KP may mean an operation for determining a position of the key point KP in the reduction image IMG2 (for example, a position of the key point KP in the reduction image IMG2 along each of a height direction and a width direction). In this case, the key point extraction unit 212 may determine the position of the key point KP in the reduction image IMG2. When the key point KP is extracted by using the neural network as described above, the neural network may output the position of the key point KP in the reduction image IMG2.

Again in FIG. 3, then, the target area set unit 213 sets the target area TA that designates a part of the person image IMG1 based on the key point extracted at the step S13 (namely, the key point KP in the reduction image IMG2) (a step S14).

The target area set unit 213 may determine a position in the person image IMG1 that corresponds to the position of the key point KP in the reduction image IMG2 and set the target area at a position in the person image IMG1 that is determined based on the determined position. When a plurality of key points KP are extracted in the reduction image IMG2, the target area set unit 213 may determine a position in the person image IMG1 that corresponds to at least one of the plurality of the key points KP and set the target area at a position in the person image IMG1 that is determined based on the determined position.

Figure 5:
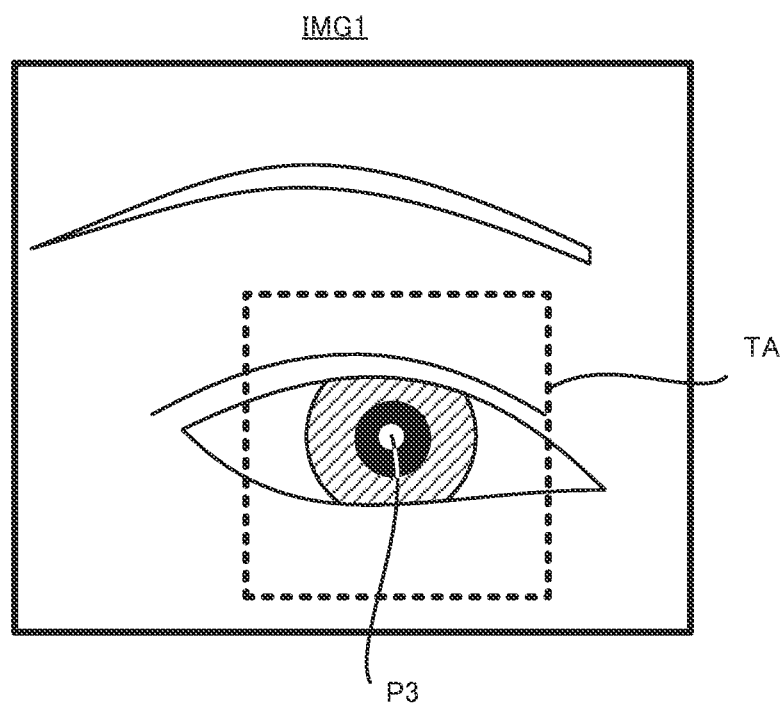
FIG. 5 is a planar view that illustrates one example of a target area.

FIG. 5 illustrates one example of the target area TA. As illustrated in FIG. 5, the target area set unit 213 may set, as the target area, an area that has a desired shape and that spreads from a position of the center of the iris in the person image IMG1. In this case, the target area set unit 213 may determine a position P3 of the center of the iris in the person image IMG1 based on the key point KP3 that determines the center of the iris in the reduction image IMG2. For example, the target area set unit 213 may determine the position P3 of the center of the iris in the person image IMG1 by converting the position of the key point KP3 that determines the center of the iris in the reduction image IMG2 into a position in the person image IMG1. Then, the target area set unit 213 may set, as the target area, an area that has the desired shape and that spreads from the position P3 of the center of the iris in the person image IMG1. Namely, the target area set unit 213 may set the target area at a position that spreads from the position of the center of the iris in the person image IMG1.

In an example illustrated in FIG. 5, the target area set unit 213 sets the target area TA that has a rectangular shape (namely, a square shape or an oblong shape). However, the target area set unit 213 may set the target area TA that has a shape that is different from the rectangular shape. For example, the target area set unit 213 may set the target area TA that has a circular shape. For example, the target area set unit 213 may set the target area TA that has an oval shape. For example, the target area set unit 213 may set the target area TA that has any polygonal shape. For example, the target area set unit 213 may set the target area TA that has any shape. Note that the target area set unit 213 sets the target area TA having a fixed size that is determined in advance, however, the target area set unit 213 may change a size of the target area TA as described in detail later as a modified example.

Again in FIG. 3, then, the target area set unit 213 extracts (namely, cuts), from the person image IMG1, the target image IMG1_TA of the person image IMG1 that is included in the target area TA (a step S15).

Figure 6:
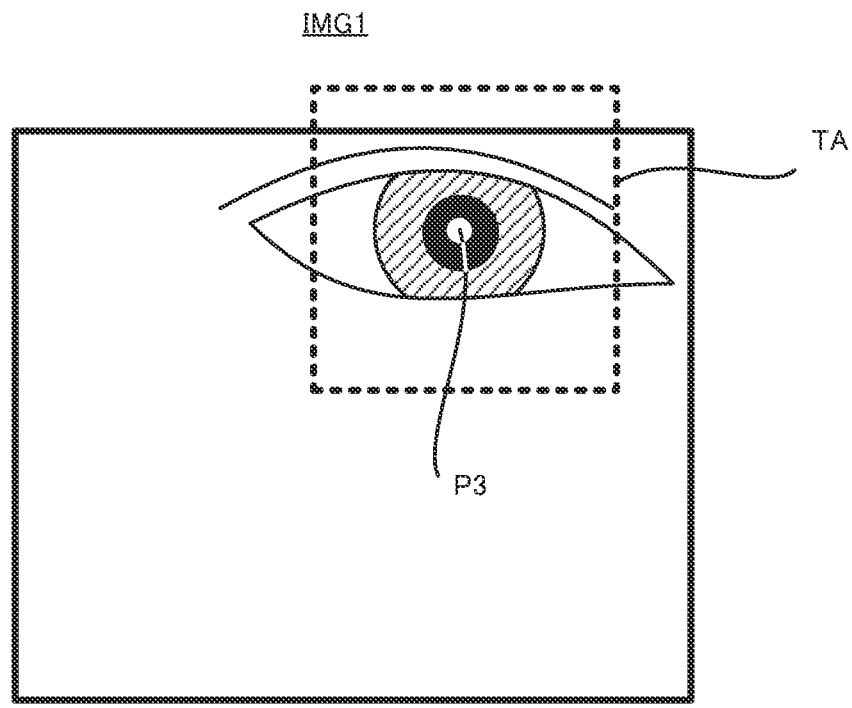
FIG. 6 is a planar view that illustrates one example of the target area.

Here, the target area TA is set sometimes so that a part of the target area TA does not overlap with the person image IMG1. For example, when the target area TA that spreads from the position P3 of the center of the iris and the size of which is N times as large as the diameter of the iris is set as described above, there is a possibility that a part of the target area TA does not overlap with the person image IMG1 depending on the position of the iris in the person image IMG1. For example, as illustrated in FIG. 6, when the iris is near an edge of the person image IMG1 in the person image IMG1, there is a possibility that a part of the target area TA does not overlap with the person image IMG1 (for example, a part of the target area TA is outside the person image IMG1). In this case, the target area set unit 213 may perform a padding processing for enlarging the person image IMG1 by using padding data so that a part of the target area TA that is outside the person image IMG1 overlaps with the padded person image IMG1. In this case, the target area set unit 213 may perform the padding processing so that an image part of the person image IMG1 that is enlarged by the padding data overlaps with a part of the target area TA that is outside the person image IMG1. Note that any method may be used as a method for the padding processing. At least one of a duplicating method (a duplicate padding) and a reflection method (a reflection padding) is one example of the method for the padding processing.

Figure 7:
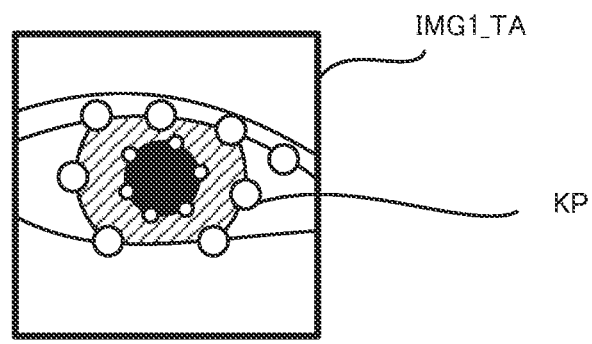
FIG. 7 is a planar view that illustrates one example of the key point of the iris that is extracted from a target image.

Again in FIG. 3, then, the key point extraction unit 214 extracts the key point KP of the iris that is included in the target image IMG1_TA from the target image IMG1_TA extracted at the step S15 (a step S16). Namely, as illustrated in FIG. 7, the key point extraction unit 214 extracts the key point KP from the target image IMG1_TA that is a part of the person image IMG1 instead of extracting the key point KP from whole of the person image IMG1. Even in this case, the iris is properly included in the target image IMG1_TA as illustrated in FIG. 7, because the target area TA is set based on the key point KP extracted from the reduction image IMG2. Conversely, the target area TA is set so that the iris is properly included in the target image IMG1_TA (specifically, so that the iris is properly included in the target image IMG1_TA to allow necessary key point KP to be extractable). Thus, even when the key point KP of the iris is extracted from the target image IMG1_TA, the key point extraction part 214 is capable of extracting the necessary key point KP properly (typically, without shortage), as with a case where the key point KP of the iris is extracted from whole of the person image IMG1.

Note that an operation for extracting the key point KP at the step S16 may be same as the operation for extracting the key point KP at the step S13. Namely, the key point extraction unit 214 may extract the key point KP at the step S16, as with the key point extraction unit 212 that extracts the key point KP at the step S13. Thus, a detailed description of the operation for extracting the key point KP at the step S16 is omitted.

The key point extraction unit 214 may determine a position of the key point KP in the target image IMG1_TA (namely, a position of the key point KP in the person image IMG1), as with the key point extraction unit 212 that determines the position of the key point KP in the reduction image IMG2. In this case, the key point extraction unit 214 may determine the position itself (namely, an absolute position) of the key point KP in the person image IMG1. Alternatively, the key point extraction unit 214 may determine the relative position of the key point KP in the person image IMG1 relative to the position of the key point KP in the reduction image IMG2. In this case, the key point extraction unit 214 may be regarded to determine a correction amount for correcting the position of the key point KP in the reduction image IMG2 to the position of the key point KP in the person image IMG1.

Then, the key point KP extracted at the step S16 may be used for a desired information processing (for example, an information processing relating to the above described iris authentication).

(1-4) Technical Effect of Key Point Extraction Apparatus 2

As described above, the key point extraction apparatus 2 in the first example embodiment extracts the key point KP from the target image IMG1_TA of the person image IMG1 that is included in the target area TA. Thus, a time required for the key point extraction apparatus 2 to extract the key point KP from the target image IMG1_TA is shorter than a time required for extracting the key point KP from whole of the person image IMG1. Furthermore, although the key point extraction apparatus 2 extracts the key point KP from whole of the reduction image IMG2 in order to set the target area TA, a time required for extracting the key point KP from whole of the reduction image IMG2 is much shorter than the time required for extracting the key point KP from whole of the person image IMG1. Thus, the key point extraction apparatus 2 is capable of extracting the key point KP relatively rapidly.

Furthermore, since the person image IMG1 is not a reduced image, the target image IMG1_TA is not a reduced image either. Thus, an accuracy of the key point KP extracted from the target image IMG1_TA is higher than that of the key point KP extracted from the reduction image IMG2. Specifically, a difference (for example, a difference of the position) between the key point KP extracted from the target image IMG1_TA and an actual key point KP is smaller than a difference between the key point KP extracted from the reduction image IMG2 and the actual key point KP. Thus, the key point extraction apparatus 2 is capable of extracting the key point KP accurately.

As described above, the key point extraction apparatus 2 is capable of extracting the key point KP relatively rapidly and extracting the key point KP accurately. Namely, the key point extraction apparatus 2 is capable of achieving both of a reduction of the time required for extracting the key point KP and an improvement of the accuracy of the extracted key point KP.

Incidentally, a key point extraction apparatus in a first comparison example that merely extracts the key point KP from the reduction image IMG2 without setting the target area TA has a technical problem that the accuracy of the extracted key point KP is low, although it is capable of extracting the key point KP relatively rapidly. On the other hand, a key point extraction apparatus in a second comparison example that merely extracts the key point KP from whole of the person image IMG1 without setting the target area TA has a technical problem that it is not capable of extracting the key point KP relatively rapidly, although the accuracy of the extracted key point KP is high. Namely, both of the key point extraction apparatus in the first comparison example and the key point extraction apparatus in the second comparison example has a technical problem that they are not capable of achieving both of the reduction of the time required for extracting the key point KP and the improvement of the accuracy of the extracted key point KP. However, the key point extraction apparatus 2 in the first example embodiment is capable of achieving both of the reduction of the time required for extracting the key point KP and the improvement of the accuracy of the extracted key point KP. Therefore, the key point extraction apparatus 2 in the first example embodiment is capable of solving the technical problem of the key point extraction apparatus in the first comparison example and the key point extraction apparatus in the second comparison example.

(1-5) Modified Example of Key Point Extraction Apparatus 2

(1-5-1) First Modified Example

In the above described description, the key point extraction apparatus 2 includes the key point extraction unit 212 that is configured to extract the key point KP from the reduction image IMG2 and the key point extraction unit 214 that is configured to extract the key point KP from the target image IMG1_TA separately. However, the key point extraction apparatus 2 may include a single key point extraction unit that is configured to extract the key point KP from each of the reduction image IMG2 and the target image IMG1_TA, in addition to or instead of the key point extraction units 212 and 214.

(1-5-2) Second Modified Example

In the above described description, the target area set unit 213 sets the target area TA having a fixed size that is determined in advance. However, the target area set unit 213 may change the size of the target area TA if needed. Namely, the size of the target area TA may be variable. Incidentally, when the shape of the target area TA is the rectangular shape, the size of the target area TA may include at least one of a size of the target area TA in the height direction and a size of the target area TA in the width direction. When the shape of the target area TA is the circular shape, the size of the target area TA may include a radius (for example, a diameter) of the target area TA. When the shape of the target area TA is the oval shape, the size of the target area TA may include at least one of a major diameter and a minor diameter of the target area TA.

Next, a specific example of an operation for changing the size of the target area TA will be described. Note that the target area set unit 213 may not perform all of below described operations when the size of the target area TA is changed. The target area set unit 213 may selectively perform a part of the below described operations when the size of the target area TA is changed.

The target area set unit 213 may change the size of the target area TA based on the key point KP in the reduction image IMG2.

As one example, when the key point KP that is usable to determine the radius (for example, the diameter) of the iris (namely, from which the radius (for example, the diameter) is determinable) is extracted as described above, the target area set unit 213 may change the size of the target area TA so that the size of the target area TA is N times as large as the diameter of the iris. A scaling factor N may be larger than 1, for example. for example, when the scaling factor N is 2 in an example illustrated in FIG. 5, the size of the target area TA in the height direction (the size in a vertical direction in FIG. 5) may be twice as large as the diameter of the iris, and the size of the target area TA in the width direction (the size in a horizontal direction in FIG. 5) may be twice as large as the diameter of the iris.

As another example, when the key point KP from which the edge of the eyelid is determinable is extracted as described above, the target area set unit 213 may change the size of the target area TA in the height direction based on the position of the eyelid. Specifically, for example, the target area set unit 213 may change the size of the target area TA so that at least one of two sides of the target area TA that face with each other along the height direction (two sides that face with each other along the vertical direction in FIG. 5) is closer to the edge of the eyelid. For example, the target area set unit 213 may change the size of the target area TA so that an upper side of the two sides of the target area TA that face with each other along the height direction is closer to an edge of an upper eyelid, for example. For example, the target area set unit 213 may change the size of the target area TA so that a lower side of the two sides of the target area TA that face with each other along the height direction is closer to an edge of a lower eyelid, for example.

Note that the target area TA may be referred to as a "surrounding area", because it is typically set to include the iris and an image part around the iris.

In this manner, in the second modified example, the key point extraction apparatus 2 is configured to change the size of the target area TA. Thus, there is a lower possibility that the size of the target area TA set by the key point extraction apparatus 2 is larger than necessary, compared to a case where the size of the target area TA is fixed (namely, is not allowed to be changed). Thus, there is a low possibility that the target image IMG1_TA that is used to extract the key point KP is larger than necessary. Thus, the key point extraction apparatus 2 is capable of extracting the key point KP included in the person image IMG1 relatively rapidly. Furthermore, there is also a lower possibility that the size of the target area TA set by the key point extraction apparatus 2 is smaller than necessary. Thus, there is a low possibility that a situation in which the necessary key point KP cannot be extracted from the target image IMG1_TA is caused due to a part of the iris not being included in the target area TA. Thus, the key point extraction apparatus 2 is capable of extracting the key point KP included in the person image IMG1 properly (typically, without shortage).

Moreover, in the second modified example, the key point extraction apparatus 2 is configured to change the size of the target area TA based on the key point KP extracted from the reduction image IMG2. The key point extraction apparatus 2 is capable of changing the size of the target area TA based on an information relating to the actual iris, because the key point KP extracted from the reduction image IMG2 includes an information relating to the iris. Thus, there is much lower possibility that the size of the target area TA set by the key point extraction apparatus 2 is larger or smaller than necessary, compared to a case where the size of the target area TA is changed without using the key point KP extracted from the reduction image IMG2. Thus, the key point extraction apparatus 2 is capable of extracting the key point KP included in the person image IMG1 relatively rapidly and properly (typically, without shortage).

Moreover, in the second modified example, the key point extraction apparatus 2 is configured to change the size of the target area TA to be a size based on the size of the iris. Thus, there is much lower possibility that the size of the target area TA set by the key point extraction apparatus 2 is larger or smaller than necessary, compared to a case where the size of the target area TA is changed without considering the size of the iris. Thus, the key point extraction apparatus 2 is capable of extracting the key point KP included in the person image IMG1 relatively rapidly and properly (typically, without shortage).

(2) Key Point Extraction System SYS in Second Example Embodiment

Next, the key point extraction system SYS in a second example embodiment will be described. Note that the key point extraction system SYS in the second example embodiment is referred to as a "key point extraction system SYSb" in the below described description.

The key point extraction system SYSb in the second example embodiment is different from the above described key point extraction system SYSa in the first example embodiment in that it includes a key point extraction apparatus 2b instead of the key point extraction apparatus 2. Another feature of the key point extraction system SYSb may be same as another feature of the key point extraction system SYSa. Thus, in the below describe description, the key point extraction apparatus 2b in the second example embodiment will be mainly described. Note that a detailed description of the component that is already described is omitted by assigning the same reference number thereto. Moreover, a detailed description of a process that is already described is omitted by assigning the same step number thereto.

(2-1) Configuration of Key Point Extraction Apparatus 2b

Figure 8:
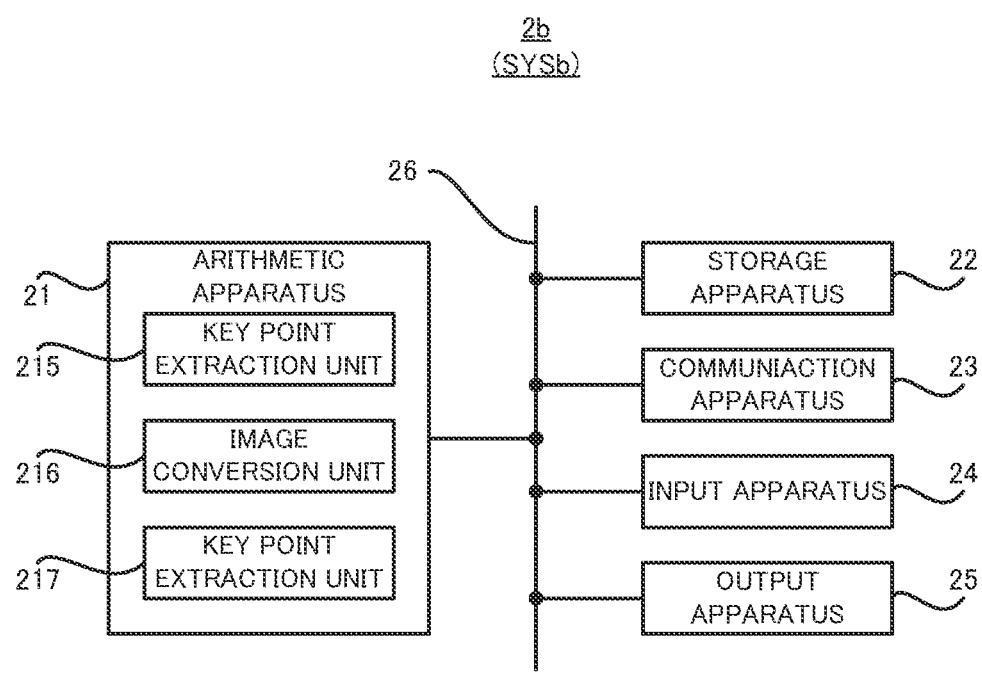
FIG. 8 is a block diagram that illustrates a configuration of a key point extraction apparatus in a second example embodiment.

Firstly, with reference to FIG. 8, a configuration of the key point extraction apparatus 2b in the second example embodiment will be described. FIG. 8 is a block diagram that illustrates the configuration of the key point extraction apparatus 2b in the second example embodiment.

As illustrated in FIG. 8, the key point extraction apparatus 2b in the second example embodiment is different from the key point extraction apparatus 2 in the first example embodiment in that the logical function block that is implemented in the arithmetic apparatus 21 of the key point extraction apparatus 2b in order to perform the key point extraction operation is different from the logical function block that is implemented in the arithmetic apparatus 21 of the key point extraction apparatus 2. Another feature of the key point extraction apparatus 2b may be same as another feature of the key point extraction apparatus 2.

As illustrated in FIG. 8, in the second example embodiment, a key point extraction unit 215 that is one specific example of a "third extracting unit", an image conversion unit 216 that is one specific example of a "image converting unit" and a key point extraction unit 217 are implemented in the arithmetic apparatus 21. Note that a detail of an operation of each of the key point extraction unit 215, the image conversion unit 216 and the key point extraction unit 217 will be described later in detail, however, a summary thereof will be described briefly here. The key point extracting unit 215 is configured to extract the key point KP of the target object (the iris in the second example embodiment) that is included in the person image IMG1 from the person image IMG1. The image conversion unit 216 is configured to generate a conversion image IMG3 by performing an image conversion processing that converts the person image IMG1 based on the key point KP extracted by the key point extraction unit 215. The key point extracting unit 217 is configured to extract the key point KP of the target object (the iris in the second example embodiment) that is included in the conversion image IMG3 from the conversion image IMG3.

Figure 9:
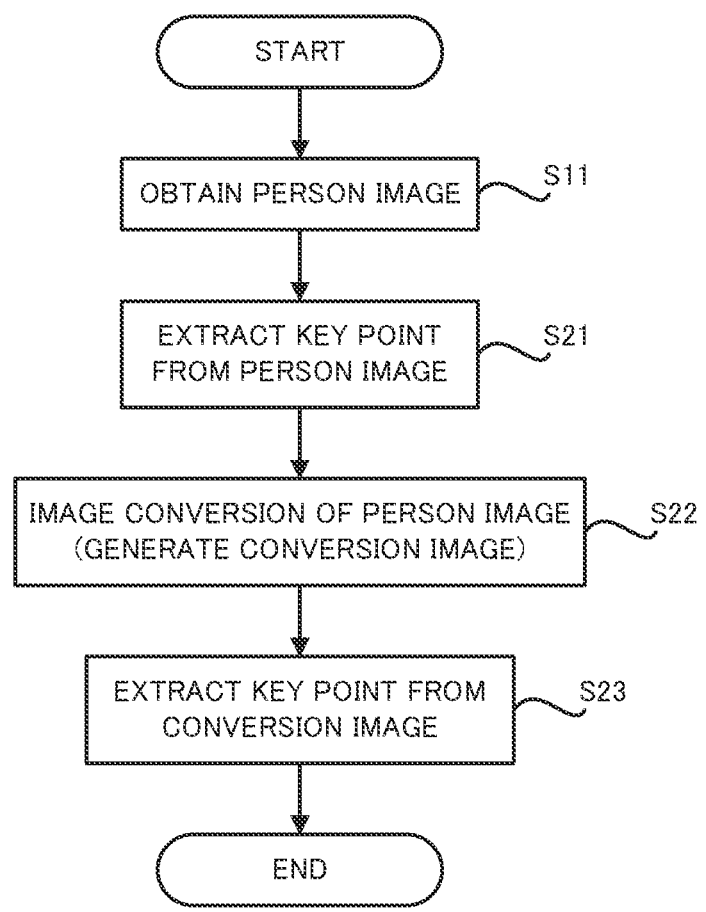
FIG. 9 is a flow chart that illustrates a flow of a key point extraction operation that is performed by the key point extraction apparatus in the second example embodiment.

(2-2) Flow of Key Point Extraction Operation Performed by Key Point Extraction Apparatus 2b Next, with reference to FIG. 9, a flow of the key point extraction operation that is performed by the key point extraction apparatus 2b in the second example embodiment will be described. FIG. 9 is a flowchart that illustrates the flow of the key point extraction operation that is performed by the key point extraction apparatus 2b in the second example embodiment.

As illustrated in FIG. 9, the key point extraction apparatus 2b obtains the person image IMG1 from the camera 1 (the step S11).

Then, the key point extracting unit 215 extracts the key point KP of the iris that is included in the person image IMG1 from the person image IMG1 obtained at the step S11 (a step S21). Note that an operation for extracting the key point KP at the step S21 may be same as the operation for extracting the key point KP at at least one of the step S13 and the step S16 in FIG. 3. Namely, the key point extraction unit 215 may extract the key point KP at the step S21, as with at least one of the key point extraction unit 212 that extracts the key point KP at the step S13 and the key point extraction unit 214 that extracts the key point KP at the step S16. Thus, a detailed description of the operation for extracting the key point KP at the step S21 is omitted.

Then, the image conversion unit 216 performs the image conversion processing that convers the person image IMG1 based on the key point KP extracted at the step S21 (a step S22). As a result, the image conversion unit 216 generates the conversion image IMG3 that is the person image IMG1 on which the image conversion processing has been performed (the step S22).

The image conversion processing at the step S22 may include or may not include a processing for changing a characteristic of the iris included in the person image IMG1. The image conversion processing at the step S22 may include or may not include a processing for normalizing the characteristic of the iris included in the person image IMG1. The characteristic of the iris may include or may not include the size (for example, the diameter) of the iris. The characteristic of the iris may include the position of the iris. The characteristic of the iris may include or may not include a direction (in other words, an angle, an angle between horizontal line and a line that connects the inner corner of the eye and the outer corner of the eye, for example) of the iris.

Alternatively, the image conversion processing at the step S22 may include or may not include a processing for changing a characteristic of the person image IMG1 in addition to or instead of the processing for changing the characteristic of the iris included in the person image IMG1. The image conversion processing at the step S22 may include or may not include a processing for normalizing the characteristic of the person image IMG1.

When a plurality of person images IMG1 are converted to a plurality of conversion images IMG3, respectively, the image conversion processing at the step S22 may include or may not include a processing for reducing a variability between the characteristics of a plurality of irises that are included in the plurality of conversion images IMG3, respectively. Namely, the image conversion processing at the step S22 may include or may not include a processing for allowing the variability between the characteristics of the plurality of irises that are included in the plurality of conversion images IMG3, respectively, is smaller than a variability between the characteristics of the plurality of irises that are included in the plurality of person images IMG1, respectively.

Under the assumption that the plurality of person images IMG1 are converted to the plurality of conversion images IMG3, respectively, the image conversion processing at the step S22 may include or may not include a processing for reducing a variability between the characteristics of the plurality of conversion images IMG3. Namely, the image conversion processing at the step S22 may include or may not include a processing for allowing the variability between the characteristics of the plurality of conversion images IMG3 is smaller than a variability between the characteristics of the plurality of person images IMG1.

Then, the key point extracting unit 217 extracts the key point KP of the iris that is included in the conversion image IMG3 from the conversion image IMG3 generated at the step S22 (a step S23). Note that an operation for extracting the key point KP at the step S23 may be same as the operation for extracting the key point KP at the step S21. Namely, the key point extraction unit 217 may extract the key point KP at the step S23, as with the key point extraction unit 215 that extracts the key point KP at the step S21. Thus, a detailed description of the operation for extracting the key point KP at the step S23 is omitted.

(2-3) Technical Effect of Key Point Extraction Apparatus 2b

As described above, the key point extraction apparatus 2b in the second example embodiment generates the conversion image IMG3 by performing the image conversion processing that converts the person image IMG1 based on the key point KP extracted from the person image IMG1, and extracts the key point KP from the conversion image IMG3. Thus, the key point extraction apparatus 2b is capable of extracting the key point KP from the conversion image IMG3 in which the iris is included in a desired aspect. Thus, the key point extraction apparatus 2b is capable of extracting the key point KP more accurately, compared to a key point extraction apparatus in a third comparison example that extracts the key point KP from the person image IMG1 in which the iris is not necessarily included in the desired aspect.

(2-4) Modified Example of Key Point Extraction Apparatus 2b

(2-4-1) First Modified Example

The image conversion processing at the step S22 in FIG. 9 may include a processing for performing a geometric transformation on the person image IMG1. As one example, the image conversion processing at the step S22 may include a processing for performing an affine transformation on the person image IMG1. Namely, the image conversion processing at the step S22 may include at least one of a translation processing for translating the person image IMG1 along at least one of the vertical direction and the width direction, a rotation processing for rotating the person image IMG1 and a scaling processing for scaling the person image IMG1. Next, with reference to FIG. 10 to FIG. 12, one example of each of the translation processing for translating the person image IMG1, the rotation processing for rotating the person image IMG1 and the scaling processing for scaling the person image IMG1 will be describe.

Figure 10:
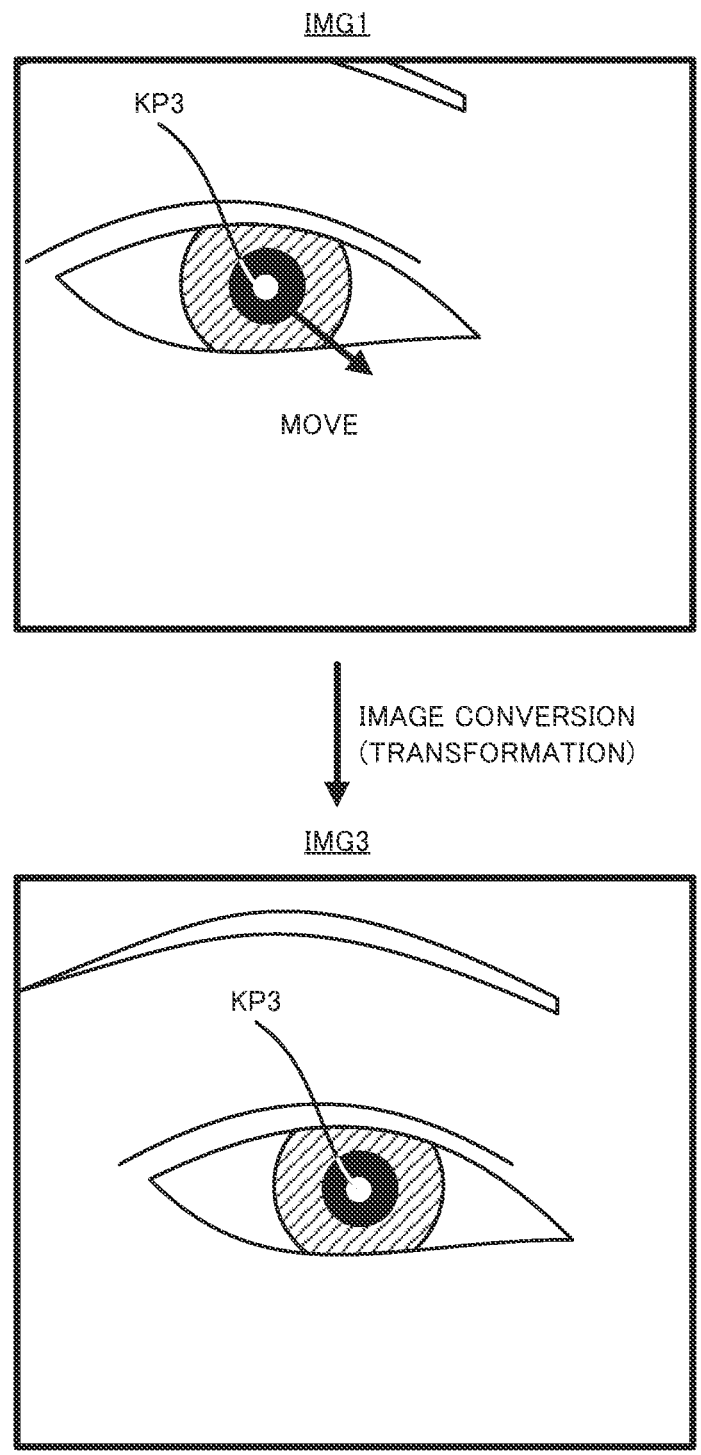
FIG. 10 conceptually illustrates a translation processing that translates a person image.

FIG. 10 conceptually illustrates the translation processing for translating the person image IMG1. As illustrated in FIG. 10, the image conversion unit 216 may translate the iris included in the person image IMG1 (namely, may change the position of the iris) by translating the person image IMG1. For example, the image conversion unit 216 may translate the person image IMG1 based on the key point KP3 from which the center of the iris is determinable so that the center of the iris is closer to a center of the person image IMG1. As a result, a distance between the center of the iris and a center of the conversion image IMG3 in the conversion image IMG3 is shorter than a distance between the center of the iris and a center of the person image IMG1 in the person image IMG1 on which the image conversion processing is not performed yet. In this case, the image conversion unit 216 may translate the person image IMG1 based on the key point KP3 from which the center of the iris is determinable so that the center of the iris is located at the center of the person image IMG1. As a result, the center of the iris, which is not located at the center of the person image IMG1 before the image conversion processing is performed, may be located at the center of the conversion image IMG3.

In this case, when the plurality of person images IMG1 are converted to the plurality of conversion images IMG3, respectively, the position of the center of the iris included in the conversion image IMG3 is approximately the same among the plurality of conversion images IMG3. Here, when the key point extraction apparatus 2b extracts the key point KP of the iris from each of the plurality of conversion images IMG3 among which the position of the center of the iris varies largely, there is a possibility that the key point extraction apparatus 2b is capable of properly extracting the key point KP from the conversion image IMG3 in which the center of the iris is located at a first position and is not capable of properly extracting the key point KP from the conversion image IMG3 in which the center of the iris is located at a second position that is different from the first position, due to a variability of the position of the center of the iris. However, in the first modified example, the key point extraction apparatus 2b is capable of properly extracting the key point KP from each of the plurality of conversion images IMG3, because the position of the center of the iris is approximately the same among the plurality of conversion images IMG3.

Figure 11:
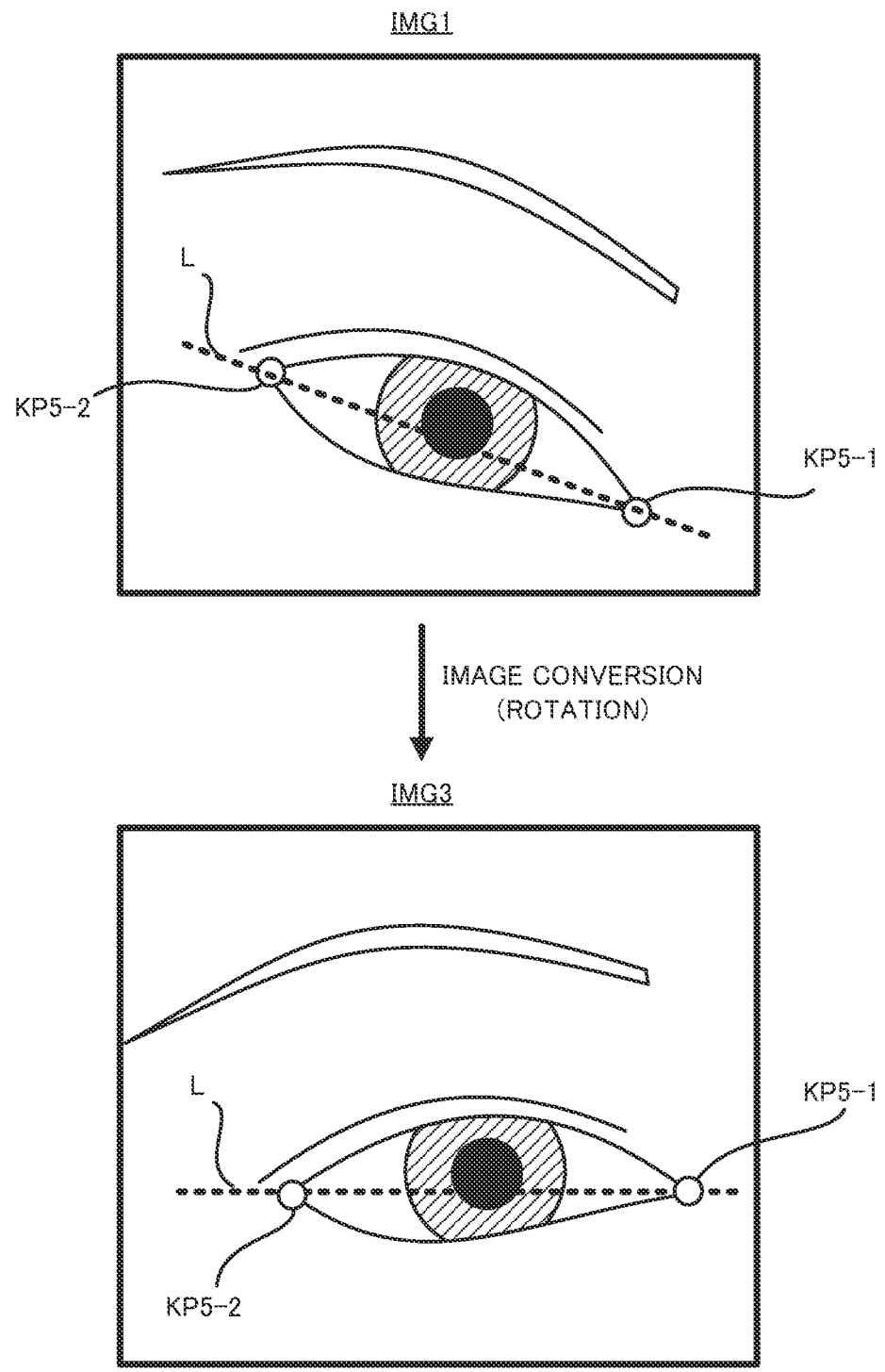
FIG. 11 conceptually illustrates a rotation processing that rotates the person image.

FIG. 11 conceptually illustrates the rotation processing for rotating the person image IMG1. As illustrated in FIG. 11, the image conversion unit 216 may rotate the iris included in the person image IMG1 (namely, may change the direction of the iris) by rotating the person image IMG1. For example, the image conversion unit 216 may rotate the person image IMG1 based on the key point KP5-1 from which the inner corner of the eye is determinable and the key point KP5-2 from which the outer corner of the eye is determinable (alternatively, the key point KP from which the line that connects the outer corner of the eye and the inner corner of the eye is determinable) so that the line that connects the outer corner of the eye and the inner corner of the eye is closer to be horizontal in the person image IMG1. As a result, the line that connects the outer corner of the eye and the inner corner of the eye in the conversion image IMG3 is closer to be horizontal than the line that connects the outer corner of the eye and the inner corner of the eye in the person image IMG1. In this case, the image conversion unit 216 may rotate the person image IMG1 so that the line that connects the outer corner of the eye and the inner corner of the eye is horizontal. As a result, the line that connects the outer corner of the eye and the inner corner of the eye, which is not horizontal before the image conversion processing is performed, may be horizontal in the conversion image IMG3.

In this case, when the plurality of person images IMG1 are converted to the plurality of conversion images IMG3, respectively, the direction of the iris (here, a direction along which the line that connects the outer corner of the eye and the inner corner of the eye extends) included in the conversion image IMG3 is approximately the same among the plurality of conversion images IMG3. Here, when the key point extraction apparatus 2b extracts the key point KP of the iris from each of the plurality of conversion images IMG3 among which the direction of the iris varies largely, there is a possibility that the key point extraction apparatus 2b is capable of properly extracting the key point KP from the conversion image IMG3 in which the direction of the iris is a first direction (for example, in which the line that connects the outer corner of the eye and the inner corner of the eye is close to the horizontal direction) and is not capable of properly extracting the key point KP from the conversion image IMG3 in which the direction of the iris is a second direction that is different from the first direction (for example, in which the line that connects the outer corner of the eye and the inner corner of the eye is largely different from the horizontal direction), due to a variability of the direction of the iris. However, in the first modified example, the key point extraction apparatus 2b is capable of properly extracting the key point KP from each of the plurality of conversion images IMG3, because the direction of the iris is approximately the same among the plurality of conversion images IMG3.

Figure 12:
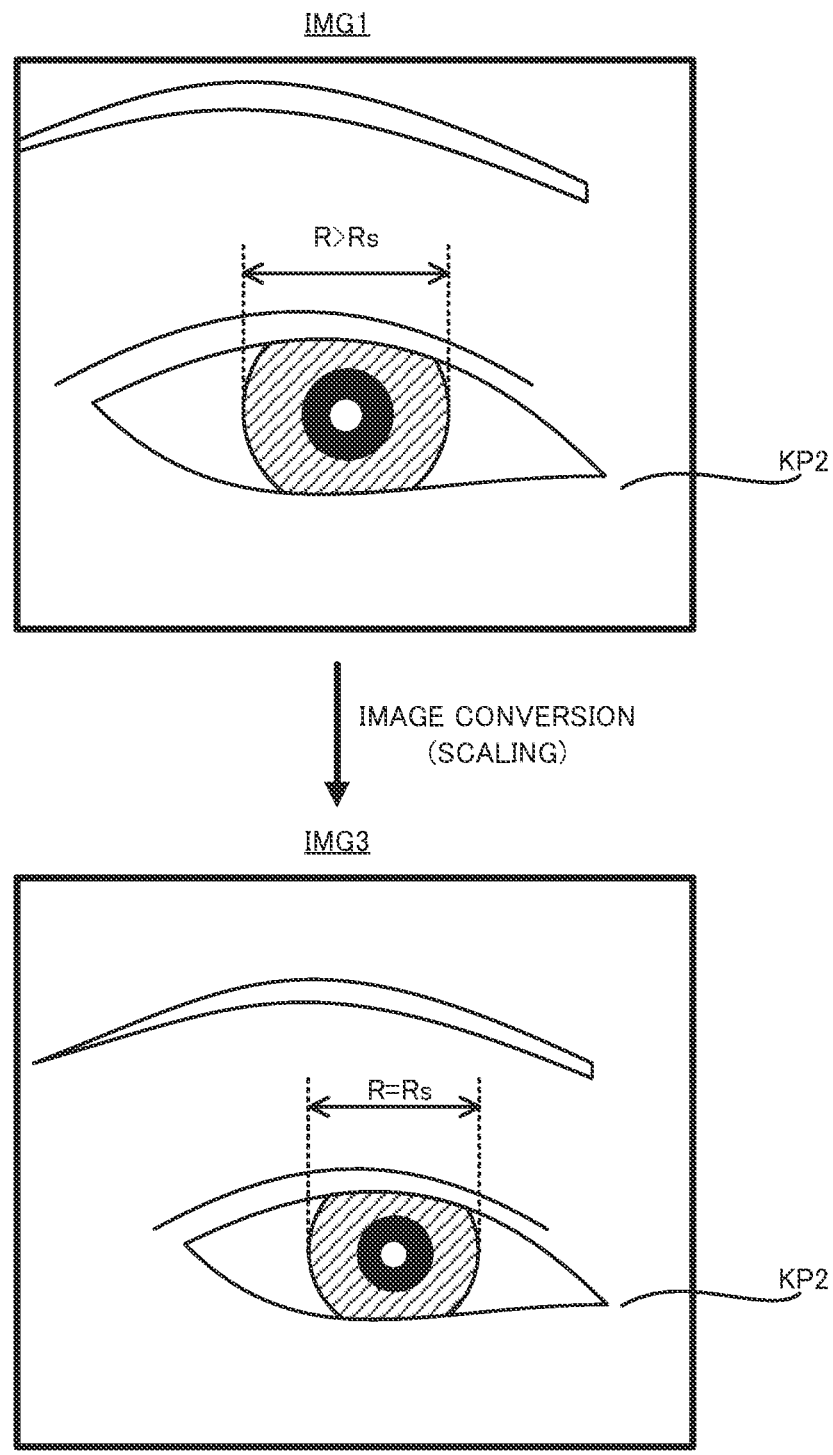
FIG. 12 conceptually illustrates a scaling processing that scales the person image.

FIG. 12 conceptually illustrates the scaling processing for scaling the person image IMG1. As illustrated in FIG. 12, the image conversion unit 216 may scale the iris included in the person image IMG1 (namely, may change the size of the iris) by scaling the person image IMG1. For example, the image conversion unit 216 may scale the person image IMG1 based on the key point KP2 from which the outer outline of the iris is determinable (alternatively, the key point KP that is usable to determine the size of the iris) so that the size of the iris in the person image IMG1 is closer to a predetermined size. As a result, a difference between the predetermined size and the size of the iris in the conversion image IMG3 is smaller than a difference between the predetermined size and the size of the iris in the person image IMG1. In this case, the image conversion unit 216 may scale the person image IMG1 so that the size of the iris in the person image IMG1 becomes the predetermined size. As a result, the size of the iris, which is not the predetermined size before the image conversion processing is performed, may become the predetermined size. Note that the processing for scaling the person image IMG1 so that the size of the iris becomes the predetermined size may be regarded to be a processing for normalizing the size of the iris.

In this case, when the plurality of person images IMG1 are converted to the plurality of conversion images IMG3, respectively, the size of the iris included in the conversion image IMG3 is approximately the same among the plurality of conversion images IMG3. Here, when the key point extraction apparatus 2b extracts the key point KP of the iris from each of the plurality of conversion images IMG3 among which the size of the iris varies largely, there is a possibility that the key point extraction apparatus 2b is capable of properly extracting the key point KP from the conversion image IMG3 in which the size of the iris is a first size and is not capable of properly extracting the key point KP from the conversion image IMG3 in which the size of the iris is a second size that is different from the first size, due to a variability of the size of the iris. However, in the first modified example, the key point extraction apparatus 2b is capable of properly extracting the key point KP from each of the plurality of conversion images IMG3, because the size of the iris is approximately the same among the plurality of conversion images IMG3.

(2-4-2) Second Modified Example

As described above, the image conversion processing at the step S22 in FIG. 9 may include the processing for changing the characteristic of the person image IMG1. In the second modified example, the characteristic of the person image IMG1 may include a brightness of the person image IMG1. Especially, the characteristic of the person image IMG1 may include a brightness of an image part of the person image IMG1 that corresponds to the iris. In this case, the image conversion processing at the step S22 may include, as the processing for normalizing the brightness of the person image IMG1, a processing for setting a maximum brightness and a minimum brightness of the person image IMG1 to be a predetermined brightness upper limit value and a brightness lower limit value, respectively.

In this case, when the plurality of person images IMG1 are converted to the plurality of conversion images IMG3, respectively, a range of the brightness (namely, a range from the maximum brightness to the minimum brightness) of the conversion image IMG3 is approximately the same. For example, a range of the brightness (namely, a range from the maximum brightness to the minimum brightness) of the image part of the conversion image IMG3 that corresponds to the iris is approximately the same. Here, when the key point extraction apparatus 2b extracts the key point KP of the iris from each of the plurality of conversion images IMG3 among which the range of the brightness varies largely, there is a possibility that the key point extraction apparatus 2b is capable of properly extracting the key point KP from the conversion image IMG3 the brightness of which is within a first range and is not capable of properly extracting the key point KP from the conversion image IMG3 the brightness of which is within a second range that is different from the first range, due to a variability of the range of the brightness. However, in the second modified example, the key point extraction apparatus 2b is capable of properly extracting the key point KP from each of the plurality of conversion images IMG3, because the range of the brightness is approximately the same among the plurality of conversion images IMG3.

(2-4-3) Other Modified Example

The key point extraction apparatus 2b may perform an operation for extracting the key point KP from the conversion image IMG3 after generating the conversion image IMG3 and generating (in this case, re-generating) new conversion image IMG3 by performing an image conversion processing that converts the conversion image IMG3 based on the extracted key point KP. Namely, the key point extraction apparatus 2b may perform the operation from the step S21 to the step S22 in FIG. 9 at least one time by using the generated conversion image IMG3 after generating the conversion image IMG3 at the step S22 in FIG. 9. The key point extraction apparatus 2b may repeat the operation from the step S21 to the step S22 in FIG. 9 two or more times by using the generated conversion image IMG3 after generating the conversion image IMG3 at the step S22 in FIG. 9. In this case, there is a high possibility that the iris is included in the conversion image IMG3 in the desired aspect. For example, there is a high possibility that the center of the iris is located at the center of the conversion image IMG3, the line that connects the outer corner of the eye and the inner corner of the eye is horizontal, the size of the iris is the predetermined size and/or the maximum brightness and the minimum brightness become the brightness upper limit value and the brightness lower limit value, respectively. As a result, the key point extraction apparatus 2b is capable of properly extracting the key point KP from the conversion image IMG3 in which the iris is included in the desired aspect.

The key point KP that is extracted by the key point extraction unit 215 at the step S21 in FIG. 9 is mainly used by the image conversion unit 216 to perform the image conversion processing. In this case, the accuracy of the key point KP is not necessarily high. Thus, in the step S21 in FIG. 9, the key point extraction unit 215 may extract the key point KP from the image (namely, the reduction image IMG2) that is obtained by reducing the person image IMG1 instead of the person image IMG1.

A type of the key point KP that is extracted by the key point extraction unit 215 at the step S21 in FIG. 9 may be same as a type of the key point KP that is extracted by the key point extraction unit 217 at the step S23 in FIG. 9.

Alternatively, the type of the key point KP that is extracted by the key point extraction unit 215 at the step S21 in FIG. 9 may be partially different from the type of the key point KP that is extracted by the key point extraction unit 217 at the step S23 in FIG. 9. For example, at the step S21 in FIG. 9, the key point extraction unit 215 may extract at least the key point KP the type of which is necessary for the image conversion unit 216 to perform the image conversion processing. As one example, at the step S21 in FIG. 9, the key point extraction unit 215 may extract the key point KP3 from which the center of the iris is determinable and which is necessary for performing the above described translation processing. As another example, at the step S21 in FIG. 9, the key point extraction unit 215 may extract the key point KP5-1 from which the inner corner of the eye is determinable and the key point KP5-2 from which the outer corner of the eye is determinable (alternatively, the key point KP from which the line that connects the outer corner of the eye and the inner corner of the eye is determinable) and which are necessary for performing the above described rotation processing. As another example, at the step S21 in FIG. 9, the key point extraction unit 215 may extract the key point KP from which the size of the iris is determinable and which is necessary for performing the above described scaling processing. However, at the step S21 in FIG. 9, the key point extraction unit 215 may extract the key point KP the type of which is not always necessary for the image conversion unit 216 to perform the image conversion processing. On the other hand, at the step S23 in FIG. 9, the key point extraction unit 217 may extract the key point KP that is not extracted by the key point extraction unit 215 at the step S21 in FIG. 9. Alternatively, at the step S23 in FIG. 9, the key point extraction unit 217 may extract the key point KP that is already extracted by the key point extraction unit 215 at the step S21 in FIG. 9 in addition to or instead of the key point KP that is not extracted by the key point extraction unit 215.

Alternatively, considering that the conversion image IMG3 is generated by performing the image conversion processing on the person image IMG1, the key point KP that is extracted by the key point extraction unit 217 at the step S23 in FIG. 9 is approximately same as a key point that is obtained by a coordinate transformation, which is based on the image conversion processing, on the key point KP that is extracted by the key point extraction unit 215 at the step S21 in FIG. 9. Thus, at the step S23 in FIG. 9, the key point extraction unit 217 may extract (in this case, calculate) the key point KP by performing the coordinate transformation, which is based on the image conversion processing, on the key point KP that is extracted by the key point extraction unit 215 at the step S21 in FIG. 9.

In the above described description, the key point extraction apparatus 2b includes the key point extraction unit 215 that is configured to extract the key point KP from the person image IMG1 and the key point extraction unit 217 that is configured to extract the key point KP from the conversion image IMG3 separately. However, the key point extraction apparatus 2 may include a single key point extraction unit that is configured to extract the key point KP from each of the person image IMG1 and the conversion image IMG3, in addition to or instead of the key point extraction units 215 and 217.

(3) Key Point Extraction System SYS in Third Example Embodiment

Next, the key point extraction system SYS in a third example embodiment will be described. Note that the key point extraction system SYS in the third example embodiment is referred to as a "key point extraction system SYSc" in the below described description.

The key point extraction system SYSc in the third example embodiment is different from the above described key point extraction system SYSa in the first example embodiment in that it includes a key point extraction apparatus 2c instead of the key point extraction apparatus 2. Another feature of the key point extraction system SYSc may be same as another feature of the key point extraction system SYSa. Thus, in the below describe description, the key point extraction apparatus 2c in the third example embodiment will be mainly described.

(3-1) Configuration of Key Point Extraction Apparatus 2c

Figure 13:
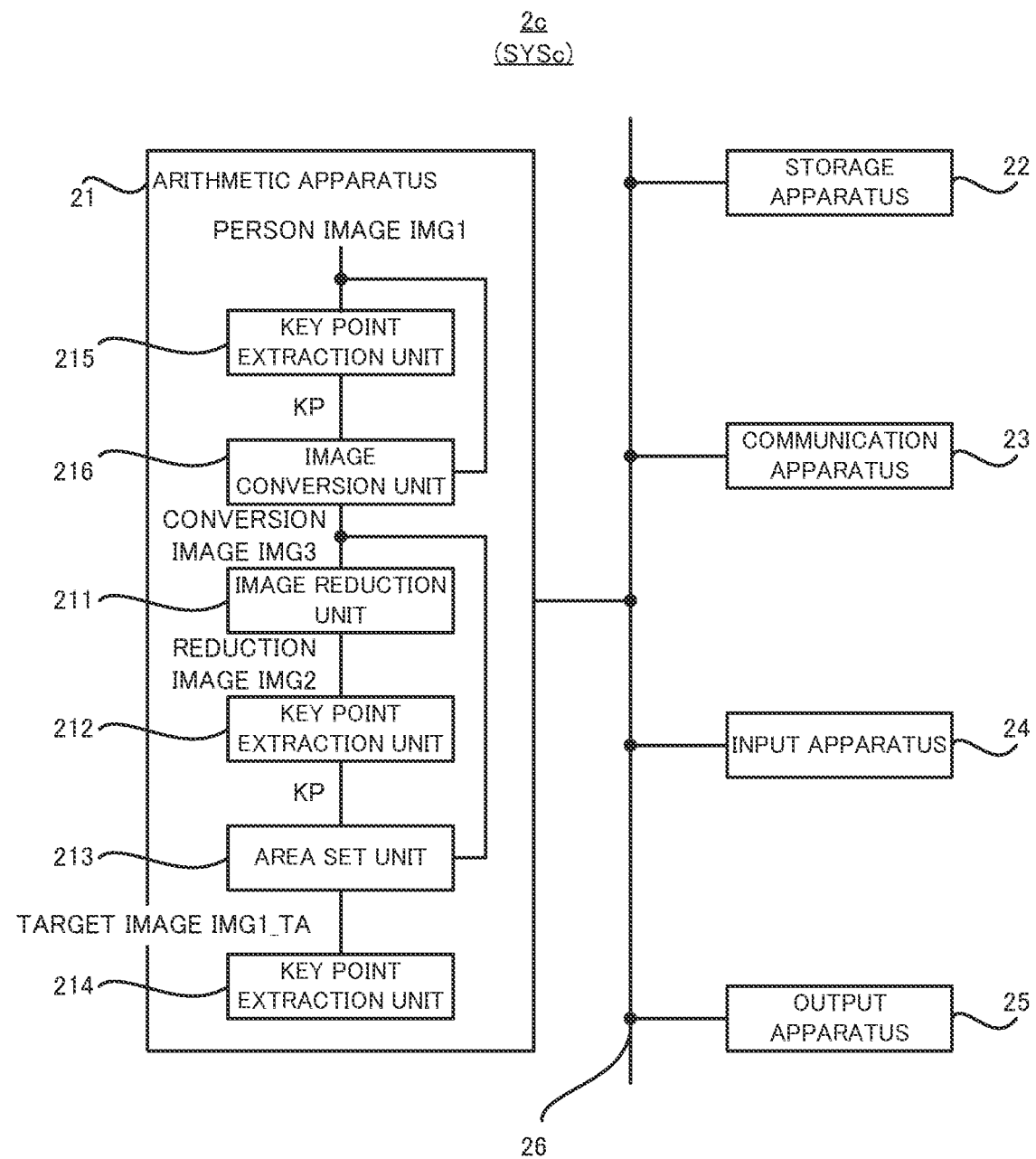
FIG. 13 is a block diagram that illustrates a configuration of a key point extraction apparatus in a third example embodiment.

Firstly, with reference to FIG. 13, a configuration of the key point extraction apparatus 2c in the third example embodiment will be described. FIG. 13 is a block diagram that illustrates the configuration of the key point extraction apparatus 2c in the third example embodiment.

As illustrated in FIG. 13, the key point extraction apparatus 2c in the third example embodiment is different from the key point extraction apparatus 2 in the first example embodiment in that the logical function block that is implemented in the arithmetic apparatus 21 of the key point extraction apparatus 2c in order to perform the key point extraction operation is different from the logical function block that is implemented in the arithmetic apparatus 21 of the key point extraction apparatus 2. Another feature of the key point extraction apparatus 2c may be same as another feature of the key point extraction apparatus 2.

As illustrated in FIG. 13, in the third example embodiment, not only the image reduction unit 211, the key point extraction unit 212, the target area set unit 213 and the key point extraction unit 214 that are described in the first example embodiment but also the key point extraction unit 215, the image conversion unit 216 that are described in the second example embodiment are implemented in the arithmetic apparatus 21. Namely, the key point extraction apparatus 2c in the third example embodiment may be a combination of the key point extraction apparatus 2 in the first example embodiment and the key point extraction apparatus 2b in the second example embodiment.

Figure 14:
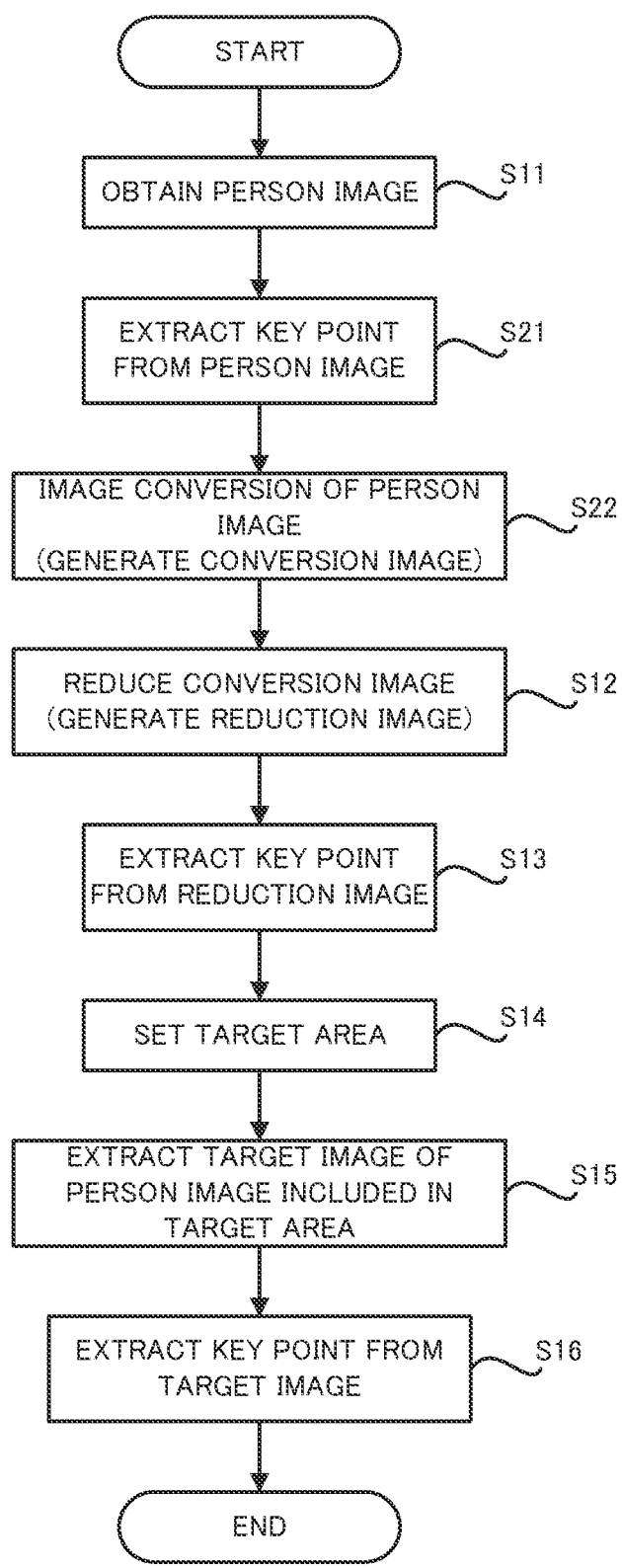
FIG. 14 is a flow chart that illustrates a flow of a key point extraction operation that is performed by the key point extraction apparatus in the third example embodiment.

(3-2) Flow of Key Point Extraction Operation Performed by Key Point Extraction Apparatus 2c Next, with reference to FIG. 14, a flow of the key point extraction operation that is performed by the key point extraction apparatus 2c in the third example embodiment will be described. FIG. 14 is a flowchart that illustrates the flow of the key point extraction operation that is performed by the key point extraction apparatus 2c in the third example embodiment.

As illustrated in FIG. 14, the key point extraction apparatus 2c firstly performs a part of the key point extraction operation in the second example embodiment (the step S11 to the step S22). Specifically, the key point extraction apparatus 2c obtains the person image IMG1 from the camera 1 (the step S11). Then, the key point extracting unit 215 extracts the key point KP of the iris that is included in the person image IMG1 from the person image IMG1 obtained at the step S11 (the step S21). Then, the image conversion unit 216 generates the conversion image IMG3 by performing the image conversion processing that convers the person image IMG1 based on the key point KP extracted at the step S21 (the step S22).

Then, the key point extraction apparatus 2c performs the key point KP in the first example embodiment by using the conversion image IMG3 instead of the person image IMG1 (the step S12 to the step S16). Specifically, the image reduction unit 211 reduces the conversion image IMG3 generated at the step S22 (the step S12). Then, the key point extraction unit 212 extracts the key point KP from the reduction image IMG2 generated at the step S12 (the step S13). Then, the target area set unit 213 sets the target area TA that designates a part of the conversion image IMG3 based on the key point extracted at the step S13 (the step S14). Then, the target area set unit 213 extracts, as the target image IMG1_TA from the conversion image IMG3, an image part of the conversion image IMG3 that is included in the target area TA (the step S15). Then, the key point extraction unit 214 extracts the key point KP from the target image IMG1_TA extracted at the step S15 (the step S16).

(3-3) Technical Effect of Key Point Extraction Apparatus 2c

As described above, the key point extraction apparatus 2c in the third example embodiment performs the key point extraction operation in the first example embodiment after performing the key point extraction operation in the second example embodiment. Thus, the key point extraction apparatus 2c in the third example embodiment is capable of achieving an effect that is same as the effect achievable by the key point extraction apparatus 2 in the first example embodiment and an effect that is same as the effect achievable by the key point extraction apparatus 2b in the second example embodiment.

(3-4) Modified Example of Key Point Extraction Apparatus 2c

In the above described description, the key point extraction apparatus 2c includes the key point extraction unit 212 that is configured to extract the key point KP from the reduction image IMG2, the key point extraction unit 214 that is configured to extract the key point KP from the target image IMG1_TA and the key point extraction unit 215 that is configured to extract the key point KP from the person image IMG1 separately. However, the key point extraction apparatus 2 may include a single key point extraction unit that is configured to extract the key point KP from at least two of the person image IMG1, the reduction image IMG2 and the target image IMG1_TA, in addition to or instead of at least two of the key point extraction units 212, 214 and 215.

(4) Key Point Extraction System SYS in Fourth Example Embodiment

Next, the key point extraction system SYS in a fourth example embodiment will be described. Note that the key point extraction system SYS in the fourth example embodiment is referred to as a "key point extraction system SYSd" in the below described description.

The key point extraction system SYSd in the fourth example embodiment is different from the above described key point extraction system SYSb in the second example embodiment in that it includes a key point extraction apparatus 2d instead of the key point extraction apparatus 2b. Another feature of the key point extraction system SYSd may be same as another feature of the key point extraction system SYSb. Thus, in the below describe description, the key point extraction apparatus 2d in the fourth example embodiment will be mainly described.

(4-1) Configuration of Key Point Extraction Apparatus 2d

Figure 15:
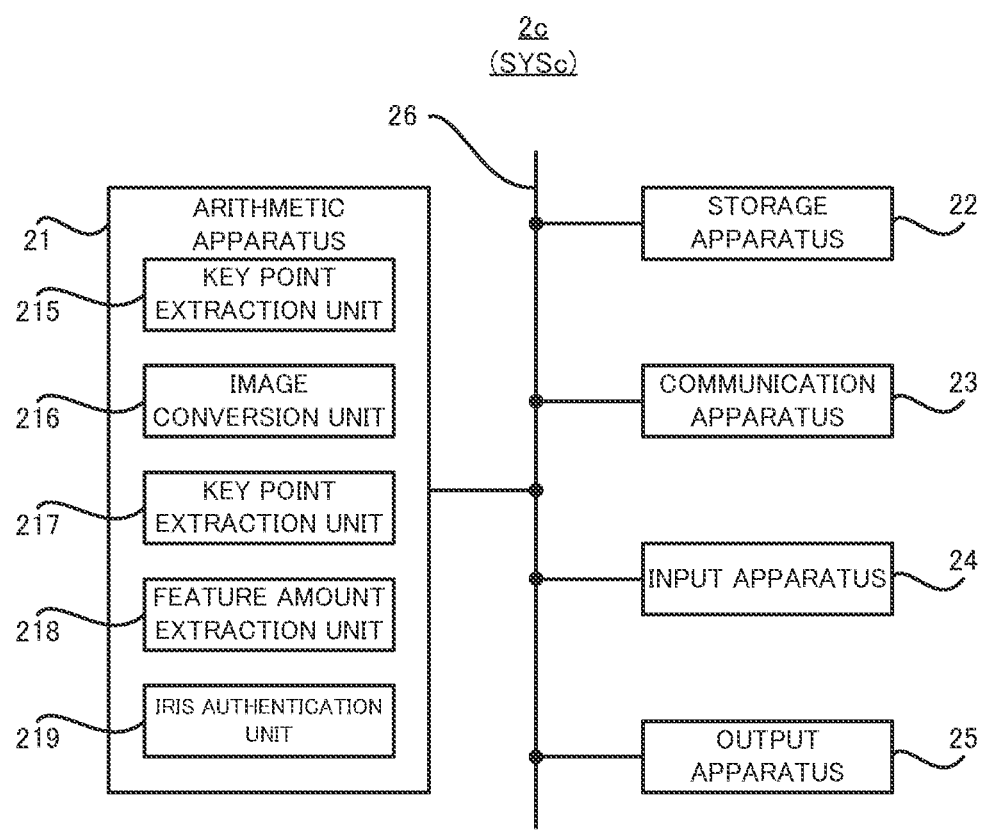
FIG. 15 is a block diagram that illustrates a configuration of a key point extraction apparatus (an iris authentication apparatus) in a fourth example embodiment.

Firstly, with reference to FIG. 15, a configuration of the key point extraction apparatus 2d in the fourth example embodiment will be described. FIG. 15 is a block diagram that illustrates the configuration of the key point extraction apparatus 2d in the fourth example embodiment.

As illustrated in FIG. 15, the key point extraction apparatus 2d in the fourth example embodiment is different from the key point extraction apparatus 2b in the second example embodiment in that a feature amount extraction unit 218 and an iris authentication unit 219 are implemented in the arithmetic apparatus 21. Another feature of the key point extraction apparatus 2d may be same as another feature of the key point extraction apparatus 2b.

Note that a detail of an operation of each of the feature amount extraction unit 218 and the iris authentication unit 219 will be described later in detail, however, a summary thereof will be described briefly here. The feature amount extraction unit 218 extracts a feature amount of the iris based on the key point KP of the iris. The iris authentication unit 219 authenticates the person included in the person image IMG1 based on the feature amount of the iris extracted by the feature amount extraction unit 218.

In this manner, the key point extraction apparatus 2d in the fourth example embodiment is capable of performing the iris authentication based on the extracted key point KP. Thus, the key point extraction apparatus 2d in the fourth example embodiment may be referred to as an iris authentication apparatus. The key point extraction operation that is performed by the key point extraction apparatus 2d in the fourth example embodiment may be referred to as an iris authentication operation. The key point extraction SYSd in the fourth example embodiment may be referred to as an iris authentication system.

Figure 16:
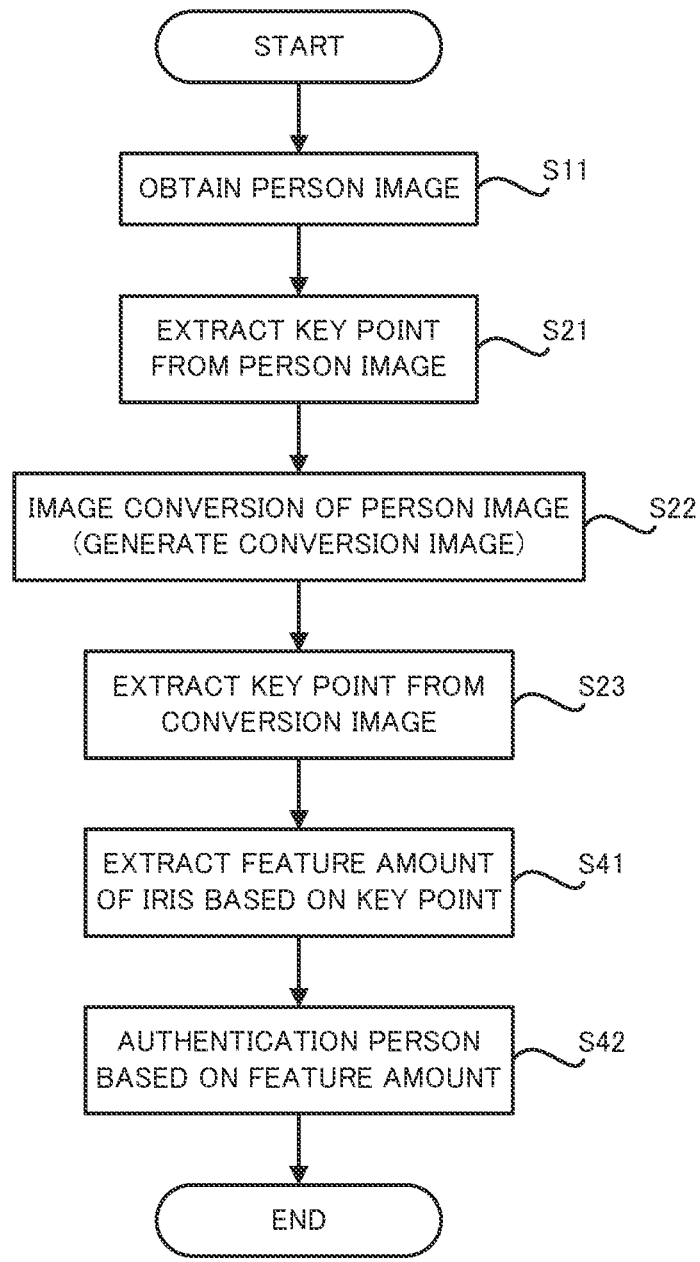
FIG. 16 is a flow chart that illustrates a flow of a key point extraction operation (an iris authentication operation) that is performed by the key point extraction apparatus in the third example embodiment.

(4-2) Flow of Key Point Extraction Operation (Iris Authentication Operation) Performed by Key Point Extraction Apparatus 2d Next, with reference to FIG. 16, a flow of the key point extraction operation that is performed by the key point extraction apparatus 2d in the fourth example embodiment (the iris authentication operation that is performed by the iris authentication apparatus in the fourth example embodiment) will be described. FIG. 16 is a flowchart that illustrates the flow of the key point extraction operation that is performed by the key point extraction apparatus 2d in the fourth example embodiment (the iris authentication operation that is performed by the iris authentication apparatus in the fourth example embodiment).

As illustrated in FIG. 16, the key point extraction apparatus 2d firstly performs the key point extraction operation in the second example embodiment (the step S11 to the step S23). Specifically, the key point extraction apparatus 2d obtains the person image IMG1 from the camera 1 (the step S11). Then, the key point extracting unit 215 extracts the key point KP of the iris that is included in the person image IMG1 from the person image IMG1 obtained at the step S11 (the step S21). Then, the image conversion unit 216 generates the conversion image IMG3 by performing the image conversion processing that convers the person image IMG1 based on the key point KP extracted at the step S21 (the step S22). Then, the key point extracting unit 217 extracts the key point KP of the iris from the conversion image IMG3 generated at the step S22 (the step S23).

Then, the feature amount extraction unit 218 extracts the feature amount of the iris included in the conversion image IMG3 based on the key point KP of the iris extracted at the step S23 and the conversion image IMG3 (a step S41). Note that the feature amount extraction unit 218 may extract the feature amount by using any method for extracting the feature amount of the iris. For example, the feature amount extraction unit 218 may determine a loop-shaped iris area in which the iris is included in the conversion image IMG3 based on the key point KP of the iris extracted at the step S23. Specifically, the feature amount extraction unit 218 may determine the iris area based on the key point KP1 from which the inner outline of the iris is determinable and the key point KP2 from which the outer outline of the iris is determinable. Furthermore, the feature amount extraction unit 218 may delete an area part that overlaps with the eyelid from the loop-shaped iris area based on the key point KP4 from which the edge of the eyelid is determinable. Then, the feature amount extraction unit 218 may divide the iris area into a plurality of ring-shaped blocks, divide each block into a plurality of sectors, and extract a feature amount of each sector (for example, a feature amount relating to a pattern of the iris included in the plurality of sectors, and a brightness value for example). Incidentally, as can be understandable from the description of the feature amount extraction unit 218, the present disclosure clearly distinguishes a feature point (namely, the key point KP) from the feature amount of the iris.

Then, the iris authentication unit 219 authenticates the person included in the conversion image IMG3 (namely, the person included in the person image IMG1) based on the feature amount of the iris extracted at the step S42 (a step S41). Note that the iris authentication unit 219 may authenticate the person by using any method for authenticating the person based on the feature amount of the iris. For example, the iris authentication unit 219 may perform a matching between the feature amount that is extracted (hereinafter, it is referred to as an "extracted feature amount") and the feature amounts of the irises of various persons stored (in other words, registered) in an iris database (hereinafter, it is referred to as a "registered feature amount"). Specifically, the iris authentication unit 219 may calculate a matching score that indicates a similarly between the registered feature amount and the extracted feature amount. Then, the iris authentication unit 219 may authenticate the person included in the conversion image IMG3 based on the matching score. For example, when the matching score that indicates the similarly between a certain registered feature amount and the extracted feature amount is smaller than a predetermined threshold value, the iris authentication unit 219 may determine that the person included in the conversion image IMG3 is not a person corresponding to the registered feature amount. On the other hand, for example, when the matching score that indicates the similarly between a certain registered feature amount and the extracted feature amount is larger than the predetermined threshold value, the iris authentication unit 219 may determine that the person included in the conversion image IMG3 is the person corresponding to the registered feature amount.

(4-3) Technical Effect of Key Point Extraction Apparatus 2d

The key point extraction apparatus 2d in the fourth example embodiment is capable of achieving an effect that is same as the effect achievable by the key point extraction apparatus 2b in the second example embodiment. Furthermore, the key point extraction apparatus 2d is capable of authenticating the person included in the person image IMG1 based on the iris of the person.

(4-4) Modified Example of Key Point Extraction Apparatus 2d

In the above described description, the key point extraction apparatus 2d in the fourth example embodiment is different from the key point extraction apparatus 2b in the second example embodiment in that the feature amount extraction unit 218 and the iris authentication unit 219 are implemented in the arithmetic apparatus 21. Namely, in the above described description, the key point extraction apparatus 2b in the second example embodiment includes the feature amount extraction unit 218 and the iris authentication unit 219. However, at least one of the key point extraction apparatus 2 in the first example embodiment and the key point extraction apparatus 2c in the third example embodiment the feature amount extraction unit 218 and the iris authentication unit 219. In this case, the feature amount extraction unit 218 may extract the feature amount of the iris based on the key point KP extracted by the key point extraction unit 214 (namely, the key point KP extracted from the target image IMG1_TA).

The iris database that is used to authenticate the person includes an iris record in which the feature amount of the iris (the registered feature amount) extracted from the image in which a certain person is included is associated with a person identification information for uniquely identifying the person, for example. Especially, the iris database includes a plurality of iris records that correspond to a plurality of persons, respectively, because the feature amounts of the irises of the plurality of persons are stored in the iris database. In this case, the iris database may include the iris record in which the feature amount of the iris extracted from the image that includes the iris of the certain person in a first aspect is associated with the person identification information and the iris record in which the feature amount of the iris extracted from the image that includes the iris of the same person in a second aspect that is different from the first aspect is associated with the person identification information, for example. For example, as described above, the characteristic of the iris may include the size (for example, the diameter) of the iris. In this case, the iris database may include the iris record in which the feature amount of the iris extracted from the image that includes the iris of the person, which is in a state where the size of the iris is a first size, is associated with the person identification information and the iris record in which the feature amount of the iris extracted from the image that includes the iris of the same person, which is in a state where the size of the iris is a second size that is different from the first size, is associated with the person identification information, for example. Even in this case, the iris authentication unit 219 may calculate the matching score by using the iris database that includes the plurality of iris records that correspond to the same person and that correspond to the different characteristics (for example, the sizes) of the iris. Alternatively, the iris authentication unit 219 may extract, from the iris database, a plurality of iris records that correspond to the characteristic (for example, the size) of the iris that is included in the person image IMG1 obtained from the camera 1 and may calculate the matching score by using the plurality of extracted iris records.

(5) Key Point Extraction System SYS in Fifth Example Embodiment

Next, the key point extraction system SYS in a fifth example embodiment will be described. Note that the key point extraction system SYS in the fifth example embodiment is referred to as a "key point extraction system SYSe" in the below described description.

Figure 17:
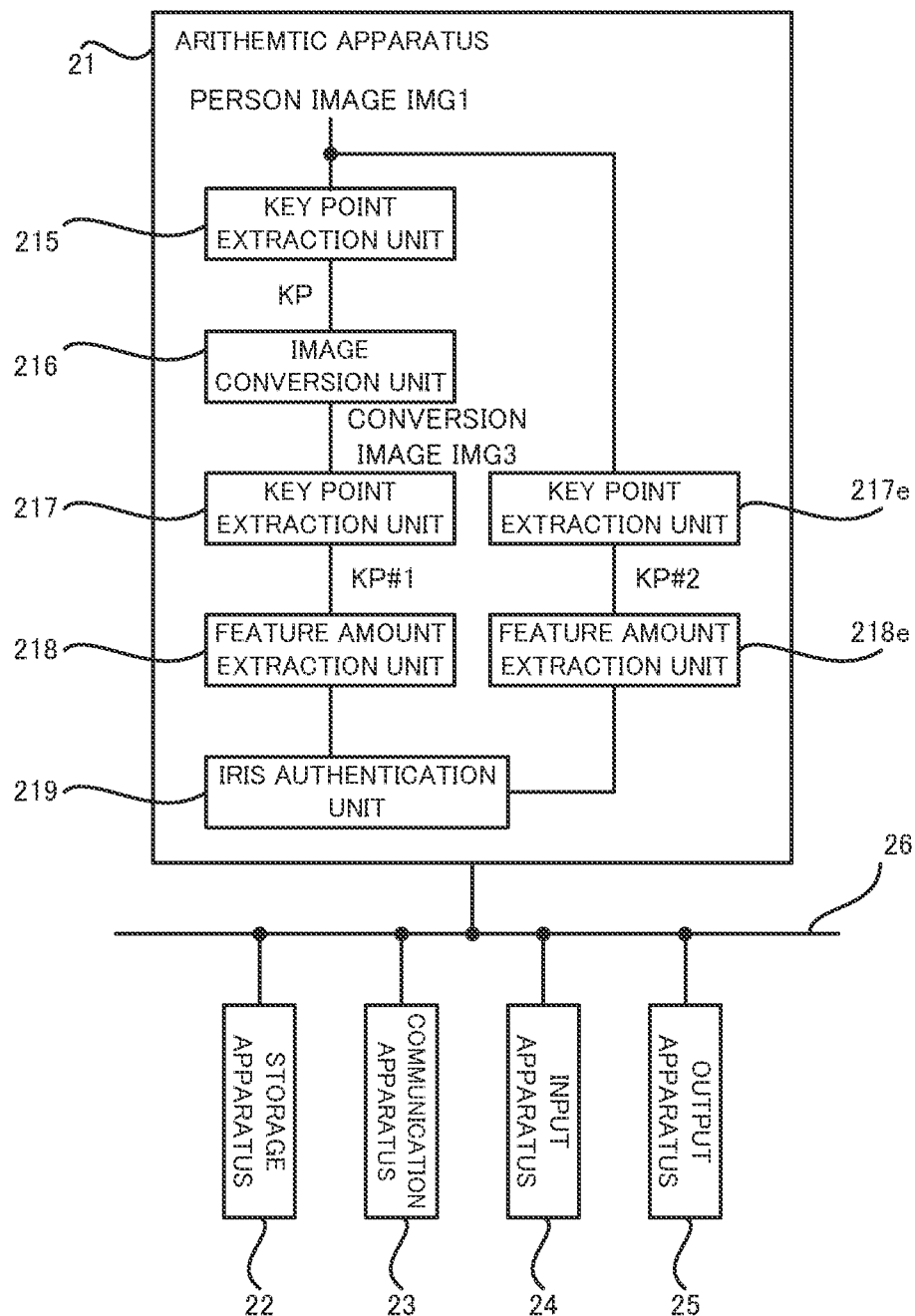
FIG. 17 is a block diagram that illustrates a configuration of a key point extraction apparatus (an iris authentication apparatus) in a fifth example embodiment.

The key point extraction system SYSe in the fifth example embodiment is different from the above described key point extraction system SYSd in the fourth example embodiment in that it includes a key point extraction apparatus 2e instead of the key point extraction apparatus 2d. Another feature of the key point extraction system SYSe may be same as another feature of the key point extraction system SYSd. Thus, in the below describe description, with reference to FIG. 17, the key point extraction apparatus 2e in the fifth example embodiment will be mainly described. FIG. 17 is a block diagram that illustrates the configuration of the key point extraction apparatus 2e in the fifth example embodiment.

As illustrated in FIG. 17, the key point extraction apparatus 2e in the fifth example embodiment is different from the key point extraction apparatus 2d in the fourth example embodiment in that a key point extraction unit 217e and a feature amount extraction unit 218e are implemented in the arithmetic apparatus 21. Another feature of the key point extraction apparatus 2e may be same as another feature of the key point extraction apparatus 2d.

The key point extraction unit 217e extracts the key point KP of the iris included in the person image IMG1 from the person image IMG1. Especially, the key point extraction unit 217e may be configured to extract one type of key point KP more accurately than the key point extraction unit 217.

For example, the key point extraction unit 217e may be configured to extract the key point KP from which the center of the pupil is determinable and the key point KP from which the diameter of the pupil is determinable more accurately than the key point extraction unit 217. In this case, the key point extraction unit 217e may extract an image part of the person image IMG1 corresponding to the iris based on the key point KP that is extracted by the key point extraction unit 215 to perform the image conversion processing (the key point KP from which the center of the iris is determinable and the key point KP from which the diameter of the iris is determinable), and may extract one type of key point KP (for example, the key point KP from which the center of the pupil is determinable and the key point KP from which the diameter of the pupil is determinable), which is extractable accurately, from the extracted image part.

The feature amount extraction unit 218e extracts the feature amount of the iris of the person included in the person image IMG1 based on the key point KP of the iris extracted by the key point extraction unit 217e and the person image IMG1.

In the fifth example embodiment, the iris authentication unit 219 authenticates the person included in the person image IMG1 based on the feature amount of the iris extracted by the feature amount extraction unit 218e and the feature amount of the iris extracted by the feature amount extraction unit 218. Specifically, the iris authentication unit 219 may calculate the matching score by using the feature amount of the iris extracted by the feature amount extraction unit 218e and the iris database and calculate the matching score by using the feature amount of the iris extracted by the feature amount extraction unit 218 and the iris database. Then, the iris authentication unit 219 may authenticate the person included in the conversion image IMG3 based on the matching scores.

The key point extraction apparatus 2e in the fifth example embodiment is capable of achieving an effect that is same as the effect achievable by the key point extraction apparatus 2d in the fourth example embodiment.

Note that the feature amount extraction unit 218e extracts the feature amount of the iris based on the key point KP of the iris extracted by the key point extraction unit 217e in the above described description. However, the feature amount extraction unit 218e may extract the feature amount of the iris based on the key point KP of the iris extracted by the key point extraction unit 217e and the key point KP of the iris extracted by the key point extraction unit 215. For example, the feature amount extraction unit 218e may calculate an average value of the key point KP of the iris extracted by the key point extraction unit 217e and the key point KP of the iris extracted by the key point extraction unit 215, and extract the feature amount of the iris based on the calculated average value of the key points KP.

Similarly, the feature amount extraction unit 218 extracts the feature amount of the iris based on the key point KP of the iris extracted by the key point extraction unit 217 in the above described description. However, the feature amount extraction unit 218 may extract the feature amount of the iris based on the key point KP of the iris extracted by the key point extraction unit 217 and the key point KP of the iris extracted by the key point extraction unit 215. For example, the feature amount extraction unit 218 may calculate an average value of the key point KP of the iris extracted by the key point extraction unit 217 and the key point KP of the iris extracted by the key point extraction unit 215, and extract the feature amount of the iris based on the calculated average value of the key points KP. Incidentally, the key point extraction unit 215 extracts the key point KP from the person image IMG1 and the key point extraction unit 217 extracts the key point KP from the conversion image IMG3 (namely, the image that is obtained by performing the image conversion processing on the person image IMG1). Thus, there is a possibility that the position of the key point KP of a certain part (for example, the center of the iris) extracted by the key point extraction unit 217 is different from the position of the key point KP of the same part extracted by the key point extraction unit 215 by an amount based on the image conversion processing. Thus, the feature amount extraction unit 218 may perform the coordinate transformation, which is based on the image conversion processing, on the key point KP extracted by at least one of the key point extraction units 215 and 217. Then, the feature amount extraction unit 218 may extract the feature amount of the iris based on the key point KP on which the coordinate transformation is performed.

(6) Supplementary Note

With respect to the example embodiments described above, the following Supplementary Notes will be further disclosed.

[Supplementary Note 1]
An information processing apparatus comprising:
a reducing unit that generates a second image by reducing a first image in which a target object is included;
a first extracting unit that extracts, as a first key point, a key point of the target object from the second image;
a setting unit that sets a target area that designates a part of the first image based on the first key point; and
a second extracting unit that extracts, as a second key point, a key point of the target object from a target image of the first image that is included in the target area.

[Supplementary Note 2]
The information processing apparatus according to Supplementary Note 1, wherein
the setting unit is configured to change a size of the target area.

[Supplementary Note 3]
The information processing apparatus according to Supplementary Note 2, wherein
the setting unit is configured to change the size of the target area based on the first key point.

[Supplementary Note 4]
The information processing apparatus according to Supplementary Note 2 or 3, wherein
the target object includes an iris of a living body,
the setting unit is configured to change the size of the target area to be a size based on a size of the iris indicated by the first key point.

[Supplementary Note 5]
The information processing apparatus according to any one of Supplementary Notes 1 to 4 further comprising:
a third extracting unit that extracts, as a third key point, a key point of the target object from a third image in which the target object is included; and
an image converting unit that generates the first image by performing an image conversion processing that converts the third image based on the third key point.

[Supplementary Note 6]
The information processing apparatus according to Supplementary Note 5, wherein
the target object includes an iris of a living body, the image conversion processing includes a translation processing that translates the third image so that a center of the iris is closer to a center of the third image.

[Supplementary Note 7]

The information processing apparatus according to Supplementary Note 5 or 6, wherein the target object includes an outer corner of an eye and an inner corner of the eye of a living body, the image conversion processing includes a rotation processing that rotates the third image so that a line that connects the outer corner of the eye and the inner corner of the eye is closer to be horizontal in the third image.

[Supplementary Note 8]

The information processing apparatus according to any one of Supplementary Notes 5 to 7, wherein the target object includes an iris of a living body, the image conversion processing includes a scaling processing that scales the third image so that a size of the iris in the third image is closer to a predetermined size.

[Supplementary Note 9]

The information processing apparatus according to any one of Supplementary Notes 5 to 8, wherein the image conversion processing includes a brightness conversion processing that normalizes a brightness of the third image.

[Supplementary Note 10]

An information processing method comprising:

generating a second image by reducing a first image in which a target object is included;

extracting, as a first key point, a key point of the target object from the second image;

setting a target area that designates a part of the first image based on the first key point; and extracting, as a second key point, a key point of the target object from a target image of the first image that is included in the target area.

[Supplementary Note 11]

A recording medium on which a computer program that allows a computer to execute an information processing method is recorded, the information processing method comprising:

generating a second image by reducing a first image in which a target object is included;

extracting, as a first key point, a key point of the target object from the second image;

setting a target area that designates a part of the first image based on the first key point; and extracting, as a second key point, a key point of the target object from a target image of the first image that is included in the target area.

At least a part of the feature of each embodiment described above may be combined with at least other part of the feature of each embodiment described above. A part of the feature of each embodiment described above may not be used. Moreover, the disclosures of all documents (for example, publications) that are cited in the present disclosure described above are incorporated in the present disclosure by reference if it is legally permitted.

The present disclosure is allowed to be changed, if desired, without departing from the essence or spirit of the invention which can be read from the claims and the entire specification, and an information processing apparatus, an information processing method, a computer program and a recording medium, which involve such changes, are also intended to be within the technical scope of the present disclosure.

DESCRIPTION OF REFERENCE CODES 1 camera
2 key point extraction apparatus
21 arithmetic apparatus
211 image reduction unit
212 key point extraction unit
213 target area set unit
214 key point extraction unit
215 key point extraction unit
216 image conversion unit
217 key point extraction unit
218 feature amount extraction unit
219 iris authentication unit
3 communication network
SYS key point extraction system
IMG1 person image
IMG2 reduction image
IMG3 conversion image
IMG1_TA target image
TA target area
KP key point

The invention claimed is:

1. An information processing apparatus comprising:

at least one memory storing instructions; and at least one processor configured to execute the instructions to:

extract, as first key points a target person and based on an image in which the target person is included, a point that is a center of an iris of the target person, and a point that is on a line that is on an edge of the target person and that passes through the center the center of the iris, such that a diameter of the iris of the target person is determined based on the extracted first key points;

set a target area that designates a part of the image based on the first key points, the target area spreading from the center of the iris and having a size that is N times as large as the diameter of the iris; and perform a padding processing for enlarging the image by using padding data, when a part of the target area does not overlap with the image, so that the part of the target area does overlap the image.

2. The information processing apparatus according to claim 1, wherein the image is a first image, and the at least one processor is configured to execute the instructions to:

generate a second image by compressing the first image;

extract the first key points from the second image;

set the target area that designates a part of the first image based on the first key points extracted from the second image; and extract, as a second key point, a key point of the target person from a target image of the first image that is included in the target area.

3. The information processing apparatus according to claim 2, wherein the at least one processor is configured to execute the instructions to:

extract, as a third key point, a key point of the target person from a third image in which the target person is included; and generate the first image by performing image conversion processing that converts the third image based on the third key point.

4. An information processing method performed by a computer and comprising:

extracting, as first key points a target person and based on an image in which the target person is included, a point that is a center of an iris of the target person, and a point that is on a line that is on an edge of the target person and that passes through the center the center of the iris, such that a diameter of the iris of the target person is determined based on the extracted first key points;

setting a target area that designates a part of the image based on the first key points, the target area spreading from the center of the iris and having a size that is N times as large as the diameter of the iris; and performing a padding processing for enlarging the image by using padding data, when a part of the target area does not overlap with the image, so that the part of the target area does overlap the image.

5. The information processing method according to claim 4, wherein the image is a first image, and the information processing method further comprises:

generating a second image by compressing the first image;

extracting the first key points from the second image;

setting the target area that designates a part of the first image based on the first key points extracted from the second image; and extracting, as a second key point, a key point of the target person from a target image of the first image that is included in the target area.

6. The information processing method according to claim 4, further comprising:

extracting, as a third key point, a key point of the target person from a third image in which the target person is included; and generating the first image by performing image conversion processing that converts the third image based on the third key point.

7. A non-transitory recording medium storing a computer program executable by a computer to perform an information processing method comprising:

extracting, as first key points a target person and based on an image in which the target person is included, a point that is a center of an iris of the target person, and a point that is on a line that is on an edge of the target person and that passes through the center the center of the iris, such that a diameter of the iris of the target person is determined based on the extracted first key points;

setting a target area that designates a part of the image based on the first key points, the target area spreading from the center of the iris and having a size that is N times as large as the diameter of the iris; and performing a padding processing for enlarging the image by using padding data, when a part of the target area does not overlap with the image, so that the part of the target area does overlap the image.

8. The non-transitory recording medium according to claim 7, wherein the image is a first image, and the information processing method further comprises:

generating a second image by compressing the first image;

extracting the first key points from the second image;

setting the target area that designates a part of the first image based on the first key points extracted from the second image; and extracting, as a second key point, a key point of the target person from a target image of the first image that is included in the target area.

9. The non-transitory recording medium according to claim 7, wherein the information processing method further comprises:

extracting, as a third key point, a key point of the target person from a third image in which the target person is included; and generating the first image by performing image conversion processing that converts the third image based on the third key point.

* * * * *